United States Patent [19]

Sakaguchi et al.

[11] Patent Number: 5,767,639
[45] Date of Patent: Jun. 16, 1998

[54] ELECTRONIC CONTROL SYSTEM FOR A BRUSHLESS ELECTRIC MOTOR

[75] Inventors: Takahiro Sakaguchi, Kokubunzi; Kenichi Nakamura, Tanashi, both of Japan

[73] Assignee: TEAC Corporation, Tokyo, Japan

[21] Appl. No.: 675,322

[22] Filed: Jul. 10, 1996

[30] Foreign Application Priority Data

Jul. 14, 1995 [JP] Japan .................................. 7-201441

[51] Int. Cl.$^6$ .................................................. H02P 6/02
[52] U.S. Cl. .......................... 318/254; 318/138; 318/245; 318/439; 318/560
[58] Field of Search .......................... 318/138, 139, 318/254, 245, 800–839; 363/17, 41; 360/70–83

[56] References Cited

U.S. PATENT DOCUMENTS 4,227,138  10/1980  Espelage et al. .................. 318/802
4,541,041   9/1985  Park et al. ........................... 363/41
5,099,186   3/1992  Rippel et al. ...................... 318/803

FOREIGN PATENT DOCUMENTS 2-299495  12/1990  Japan .

*Primary Examiner*—Paul Ip
*Attorney, Agent, or Firm*—Woodcock Washburn Kurtz Mackiewicz & Norris LLP

[57] ABSTRACT

A control system for a three phase brushless motor suitable for use in a three and a half inch flexible magnetic disk drive. The control system needs but one Hall effect sensor for providing a rotor position signal indicative of the angular position of the rotor relative to stator windings. Comparators compare the rotor position signal with reference voltages and provide moment signals indicative of the moments the rotor position signal crosses the reference voltage levels. Three phase motor excitation control signals are produced by counters which count clock pulses for preset periods in response to the moment signals. Motor speed is controlled on the basis of not only the actual motor speed but also the phase difference between the clock pulses and a signal indicative of the moments the rotor position signal crosses zero.

8 Claims, 22 Drawing Sheets

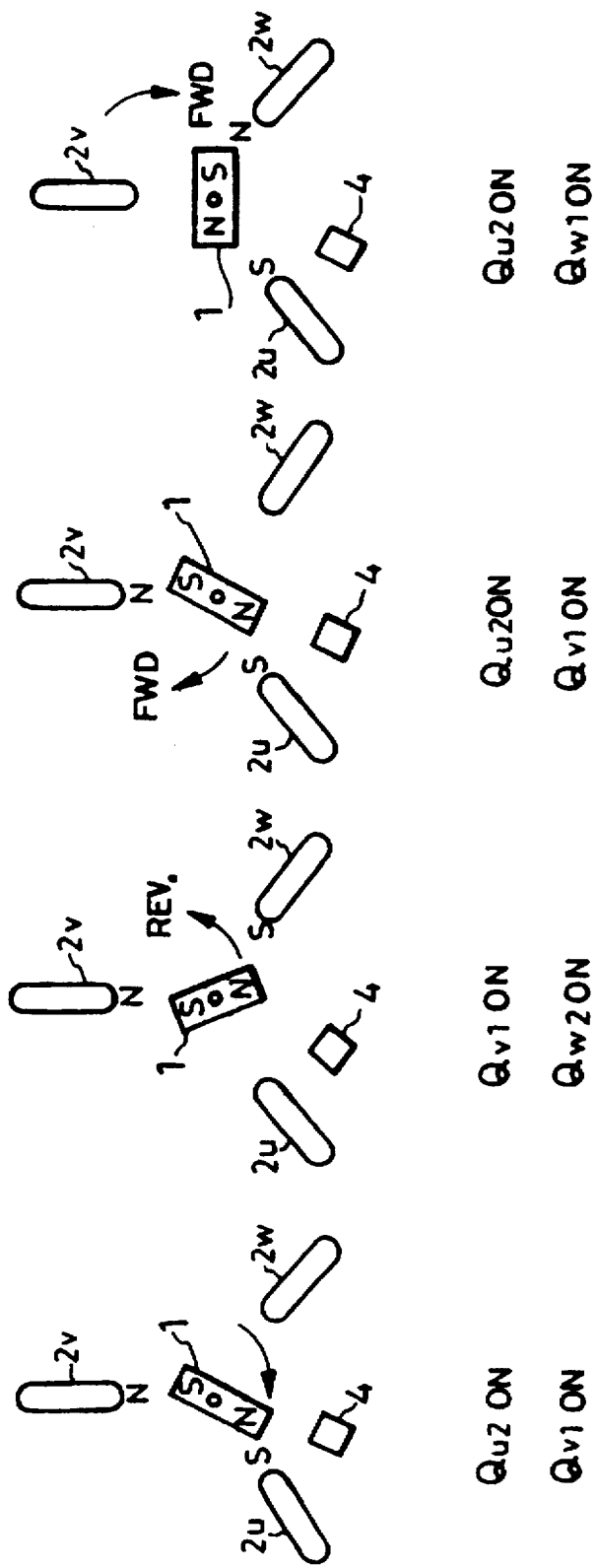

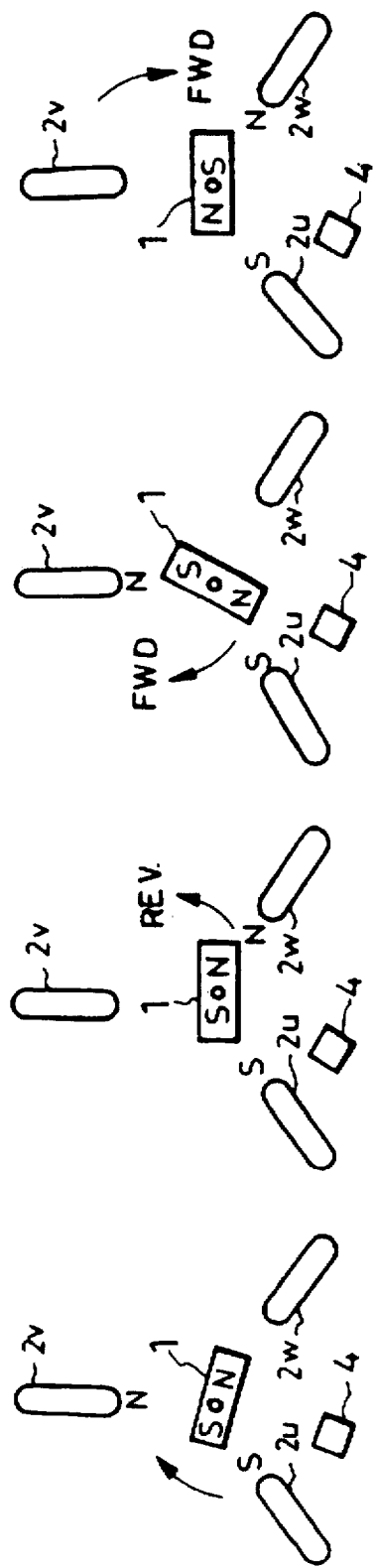

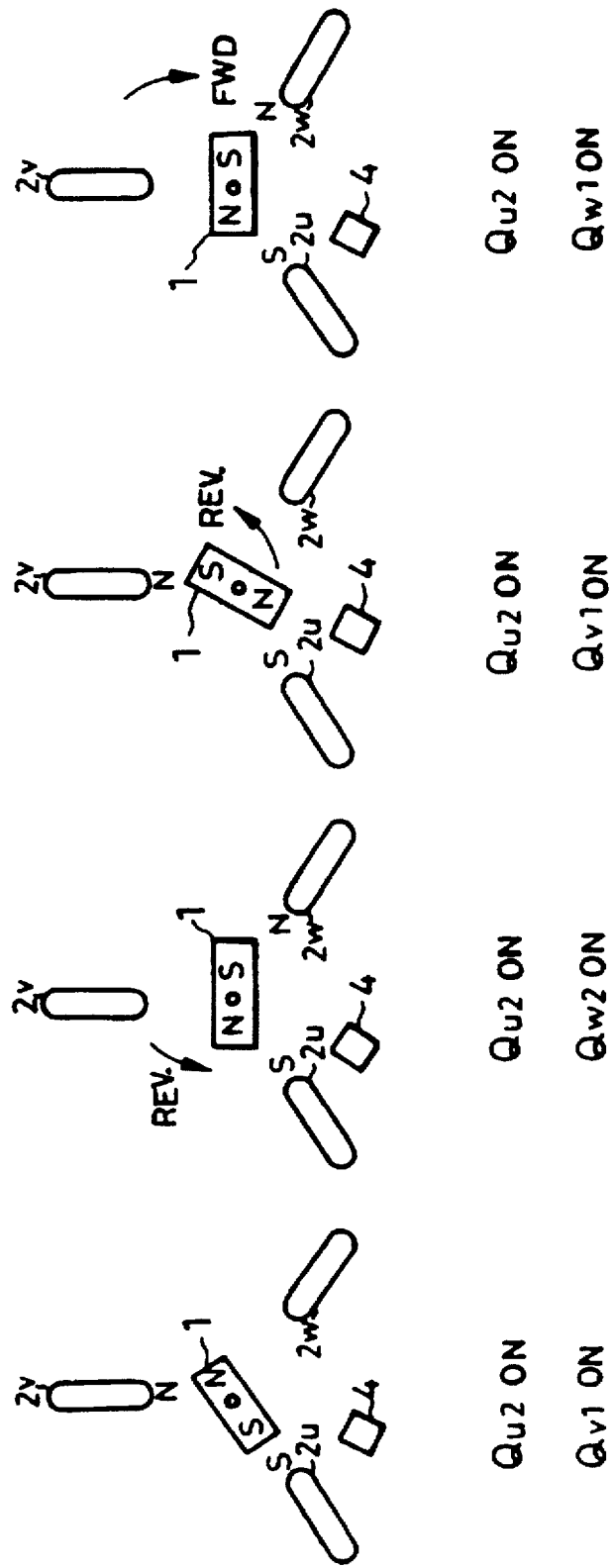

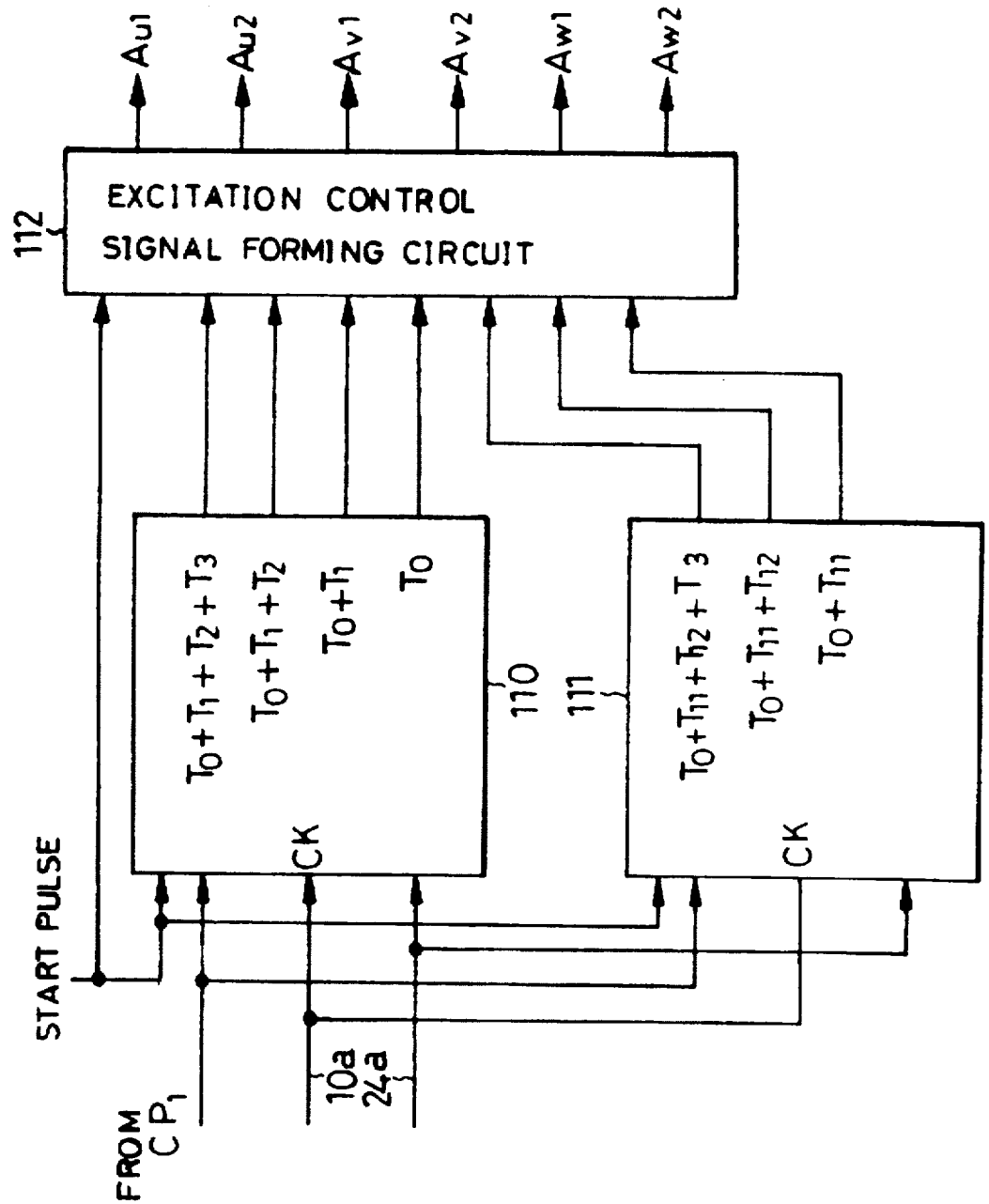

5,767,639

ELECTRONIC CONTROL SYSTEM FOR A BRUSHLESS ELECTRIC MOTOR

BACKGROUND OF THE INVENTION

This invention relates generally to electric motor control systems, and particularly to an electronic control system for motors of the brushless variety for use in rotating disk data transfer devices, among other applications.

Brushless motors, especially those of three phase design, have been used extensively in magnetic, as well as optical, disk drives. They comprise a permanent magnet rotor and three phase stator windings. The stator windings are selectively excited according to the angular position of the rotor, which position was conventionally detected by three position sensors in the form of Hall effect elements disposed at angular spacings of 120 degrees. Hall sensors are expensive, however, impeding the cost reduction of motors of the class in question.

A solution to this problem was suggested by Japanese Unexamined Patent Publication No. 2-299495. It teaches to control the excitation of three phase stator windings by the combination of a Hall sensor, a magnetic encoder in the form of a permanent magnet that has poles far greater in number than those of the rotor and which rotates with the rotor, and two magnetoresistance sensors which put out pulses representative of the encoder poles.

Although this known suggestion surely requires but one Hall sensor, its has its own weaknesses. The well controlled excitation of the stator windings is not accomplished in event the magnetoresistance sensors fail to provide pulses in exact agreement with the encoder poles. This failure is indeed easy to occur because, first, magnetoresistance sensors are generally easy to malfunction under the influence of noise, and, second, the encoder with its many magnetic poles is susceptible to mechanical errors during manufacture.

It was also proposed, for the provision of less expensive three phase brushless motors, to detect the voltage induced in each phase stator winding and to determine the rotor position by integrating the induced voltages in a filter circuit, thereby dispensing with sensors. This prior art sensorless construction is not so inexpensive as it might seem, because the filter circuit requires costly capacitors. Another drawback is that noise tends to be superposed upon the induced voltages, hampering the correct determination of the rotor position.

SUMMARY OF THE INVENTION

The present invention seeks to make brushless electric motor control systems appreciably less expensive in construction than heretofore without in any way making them susceptible to misoperation under the influence of noise.

Briefly, the present invention provides a control system for a brushless electric motor of the type having a permanent magnet rotor and a plurality of phases of stator windings in concentric arrangement, the rotor being rotatable relative to the stator windings. The control system comprises a rotor position sensor for providing a rotor position signal having a voltage varying alternatingly in step with the angular position of the rotor relative to the stator windings during the rotation of the motor. Comparison means provide a plurality of moment signals each indicative of the moment the rotor position signal has one of a set of predetermined different voltage values. For providing a set of excitation control signals, an excitation control signal forming circuit includes first counter means for providing the excitation control signals of startup waveforms by counting clock pulses, and second counter means for providing the excitation control signals of normal state waveforms by counting clock pulses in response to the moment signals. Excitation means excite the stator windings of the motor in a first predetermined manner during a startup period in response to the excitation control signals of the startup waveforms, and in a second predetermined manner after the startup period in response to the excitation control signals of the normal state waveforms.

Thus the present invention requires but one rotor position sensor such as a Hall effect element for controlling a brushless motor of, typically, three phase design. The invention has a distinct advantage over the noted conventional motor control systems in that the excitation control signals are practically free from the influence of noise because they are produced by counters that count clock pulses for preassigned periods of time. Although the present invention demands additional electronic circuitry for providing three phase excitation control signals with use of a single Hall sensor, the cost of such additional circuitry will be negligible if it is fabricated in the form of an integrated circuit with other control electronics.

The above and other features and advantages of this invention and the manner of realizing them will become more apparent, and the invention itself will best be understood, from a study of the following description and appended claims, with reference had to the attached drawings showing some preferable embodiments of the present invention.

BRIEF DESCRIPTION OF THE DRAWINGS

FIG. 18, consisting of (A) through (D), is a series of drawings, each similar to FIG. 17, useful in explaining how the motor is started up with the excitation control signals of FIG. 12;

FIG. 19 is similar to FIG. 18 but explanatory of how the motor is started up with the excitation control signals of FIG. 13;

FIG. 20 is also similar to FIG. 18 but explanatory of how the motor is started up in event the rotor position signal has the waveform indicated by the broken lines at (A) in FIG. 13;

FIG. 22 is a block diagram of alternate means for producing excitation control signals during a startup period;

DESCRIPTION OF THE PREFERRED EMBODIMENTS

Figure 1:
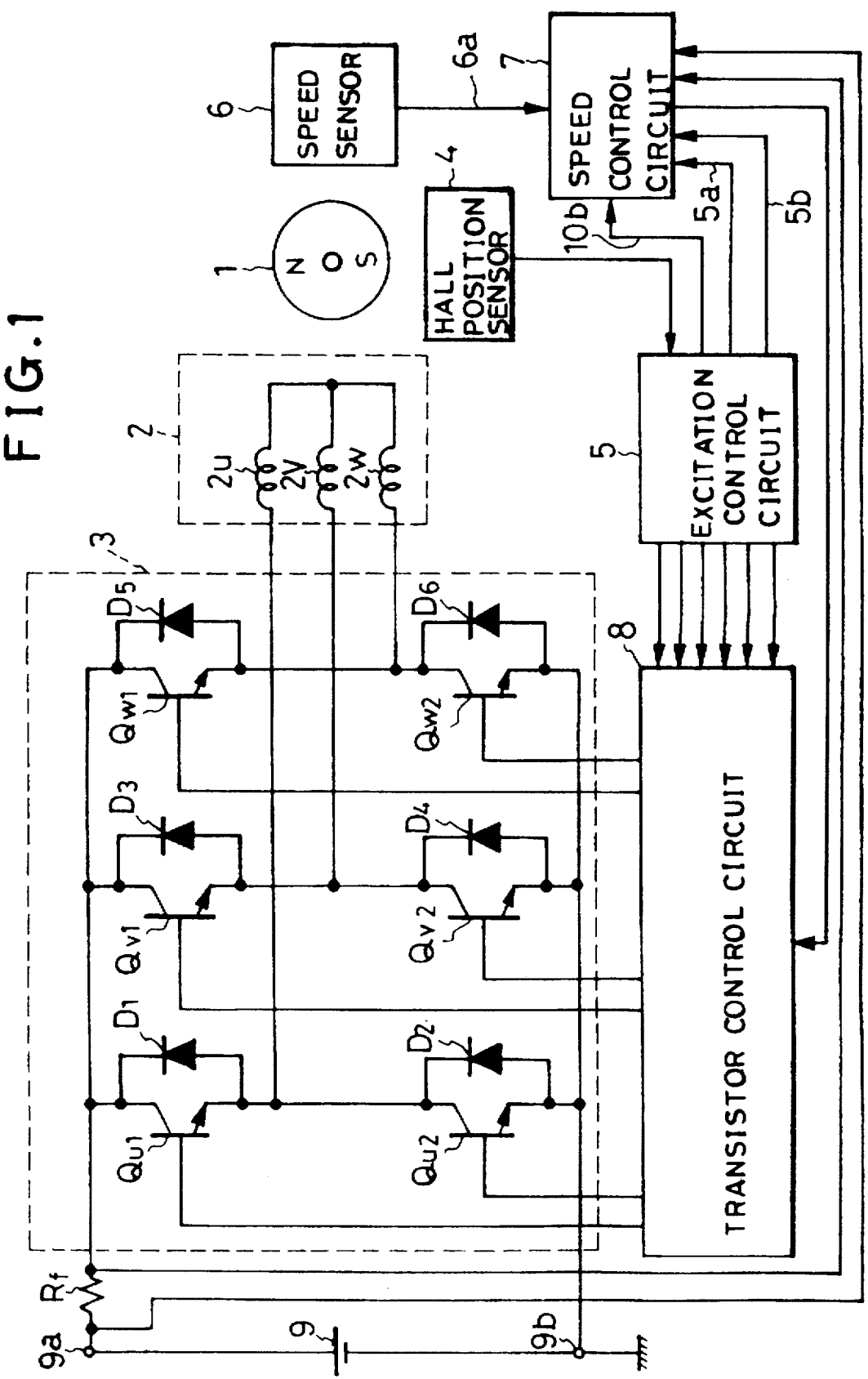
FIG. 1 is a schematic electrical diagram, partly in block form, of a three phase brushless motor control system embodying the principles of the present invention, the control system being shown together with some pertinent parts of the motor.

The present invention will now be described in detail as embodied in the illustrated control system for a three phase brushless motor intended specifically for driving flexible magnetic disks. As diagramed in FIG. 1, the exemplified brushless motor comprises a permanent magnet rotor 1, a stator 2 having three phase winding sets $2u$, $2v$ and $2w$, an excitation circuit 3 for selectively exciting the stator windings, a rotor position sensor in the form of a Hall effect element 4 for sensing the angular position of the rotor 1 relative to the stator 2, an excitation control circuit 5 having an input coupled to the Hall sensor 4, a speed sensor 6 in the form of a frequency generator which produces a signal having a frequency representative of the rotational speed of the rotor 1, a resistor Rf for detecting the currents exciting the stator windings, a speed control circuit 7 connected to all of the excitation control circuit 5 and the speed sensor 6 and the current detecting resistor Rf, and a transistor control circuit 8 for switching the transistors $Qu_1$, $Qu_2$, $Qv_1$, $Qv_2$, $Qw_1$, and $Qw_2$ of the excitation circuit 3 under the control of the excitation control circuit 5 and for controlling the motor speed under the control of the speed control circuit 7.

FIG. 1 shows the rotor 1 and the stator 2 greatly simplified for illustrative convenience. The rotor 1 is shown to have only one north seeking pole N and one south seeking pole S. Broadly speaking, the total number of rotor poles is 2n, where n is an integer. Typically, n is eight, so that the rotor has eight north and eight south poles arranged alternately and annularly. The stator 2 is shown to have only three windings, but each phase may typically have four windings. This motor is therefore a three phase, four pole motor, so that 360 degrees of electrical angle corresponds to 90 degrees of mechanical angle.

The excitation circuit 3 comprises the noted six transistors in bridge connection between the opposite polarity terminals $9a$ and $9b$ of a direct current power supply 9. The six transistors consist of a serial circuit of transistors Qu1 and Qu2 constituting a switching circuit for the first phase stator winding set $2u$, another serial circuit of transistors Qv1 and Qv2 constituting a switching circuit for the second phase stator winding set $2v$, and still another serial circuit of transistors Qw1 and Qw2 constituting a switching circuit for the third phase stator winding set $2w$. The connections between the three transistor pairs Qu1 and Qu2, Qv1 and Qv2, and Qw1 and Qw2 are connected to the three phase winding sets $2u$, $2v$ and $2w$, respectively. The bases of all these transistors are connected to the transistor control circuit 8. The excitation circuit 3 further comprises six diodes $D_1-D_6$ connected in reverse parallel with the respective transistors in order to return to the power supply 9 the energy stored on the stator windings.

Like the familiar three phase bridge inverter, the three pairs of transistors of the excitation circuit 3 are turned on and off with phase differences of 120 degrees. Further the base currents of the transistors are controlled so as to keep constant the speed of the rotor 1. More will be said presently about how the transistors are controlled.

The illustrated construction of the excitation circuit 3 admits of a variety of modifications within the broad teaching hereof. For example, the bipolar transistors depicted in FIG. 1 could be replaced by field effect transistors or by other semiconductor switching elements or control elements. The diodes $D_1-D_6$ could be integrated with the transistors Qu1–Qw2. All or either half, Qu1 and Qv1 and Qw1, or Qu2 and Qv2 and Qw2 of the transistors could be combined into the form of Darlington transistors or the like.

Figure 2:
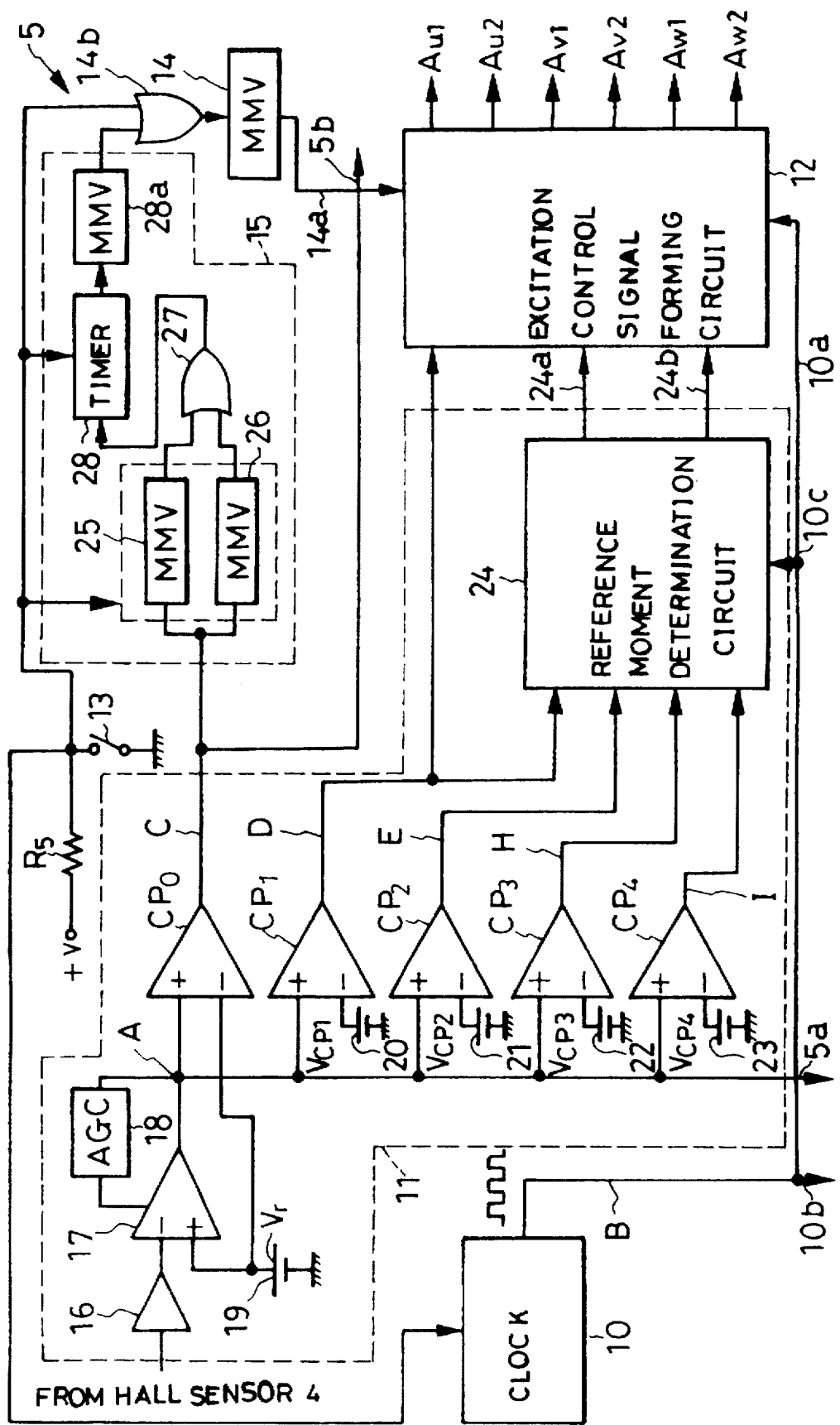
FIG. 2 is a schematic electrical diagram, partly in block form, showing the excitation control circuit of the FIG. 1 motor control system in more detail.

FIG. 2 is a detailed illustration of the excitation control circuit 5, which functions to provide, in response to the output from the single Hall sensor, the control signals required for switching the three phase stator windings $2u$, $2v$ and $2w$. Broadly, the excitation control circuit 5 comprises a clock 10, a circuit 11 for detecting particular moments of the rotor position signal from the Hall sensor 4, a excitation control signal forming circuit 12, a start switch 13, a monostable multivibrator (MMV) 14, an OR gate 14b, and a restart circuit 15.

The clock 10 generates pulses at a recurrence rate that is an integral multiple of that of the rotor position signal when the rotor 1 is in rotation at the required rpm. Conventionally comprising an oscillator and a frequency divider, the clock 10 can produce accurately timed pulses without the influence of external noise. The recurrence rate of the clock pulses may be set sufficiently high to assure accuracy in the excitation timing of the stator windings. The clock 10 is coupled to the start switch 13 to start pulse production upon closure of this switch.

The particular moment detection circuit 11 comprises an amplifier 16 having its input connected to the Hall sensor 4, another amplifier 17 complete with an automatic gain control (AGC) circuit 18, five comparators $CP_0$, $CP_1$, $CP_2$, $CP_3$ and $CP_4$ five reference voltage sources 19, 20, 21, 22 and 23, and a reference moment determination circuit 24.

The AGC amplifier 17 takes the form of an operational amplifier having a negative input coupled to the Hall sensor 4 via the amplifier 16, and a positive input coupled to the reference voltage source 19. Therefore, biased by the reference voltage Vr, the alternating current output from the Hall sensor 4 is translated by this amplifier into the waveform alternating about the reference voltage Vr, as indicated at (A) in FIG. 12 and at (A) in FIG. 13. The reference voltage source 19 could be omitted, however. The resulting waveform would then alternate about the ground potential.

The output of the AGC amplifier 17 is connected to all of the comparators $CP_0$–$CP_4$. The first comparator $CP_0$ has another input connected to the reference voltage source 19 for detecting the moments when the FIG. 12(A) rotor position signal crosses the reference voltage Vr, which as above explained is midway between the positive and the negative peaks of that signal. Such moments occur, for example, at $t_8$ and $t_{18}$ in FIG. 12. The second and third comparators $CP_1$ and $CP_2$, having other inputs connected respectively to the reference voltage sources 20 and 21, function to detect the direction in which the rotor position signal crosses the reference voltage Vr. As indicated at (A) in FIG. 12, the voltage $Vcp_1$ of the source 20 is more than the reference voltage Vr and less than the peaks of the rotor position signal. The voltage $Vcp_2$ of the source 21 is less than the reference voltage Vr and more than the negative peaks of the rotor position signal.

The second comparator $CP_1$ is intended to serve the additional purpose of ascertaining the magnitude of the rotor position signal during the startup period. The reference voltage $Vcp_1$ is therefore set at the sum of the negative peak value of the rotor position signal and approximately three quarters of the voltage Vp-p intermediate the positive and the negative peaks of the rotor position signal.

The fourth and fifth comparators $CP_3$ and $CP_4$ have their other inputs connected respectively to the reference voltage sources 22 and 23. As indicated also at (A) in FIG. 12, the reference voltage $Vcp_3$ of the source 22 is more than the reference voltage Vr and closer thereto than is the reference voltage $Vcp_1$. The reference voltage $Vcp_4$ of the source 23 is less than the reference voltage Vr and closer thereto than is the reference voltage $Vc_2$. Further the reference voltages $Vcp_3$ and $Vcp_4$ are set so close to each other that the period of time from the moment the rotor position signal crosses either of the voltages $Vcp_3$ and $Vcp_4$ to the moment the same signal subsequently crosses the other is less than one cycle of the clock pulses shown at (C) in FIG. 12.

The reference moment determination circuit 24 has inputs connected to the comparators $CP_1$–$CP_4$ and to the clock 10, a first output connected to the excitation control signal forming circuit 12 by way of a line 24a, and a second output connected to the same circuit 12 by way of a line 24b. The circuit 24 provides on its output line 24a a signal indicative of a first reference moment that is set close to the moment where the rotor position signal crosses the reference voltage Vr in a decreasing direction, and on its output line 24b another signal indicative of a second reference moment that is set close to the moment the rotor position signal crosses the reference voltage Vr in an increasing direction.

Figure 3:
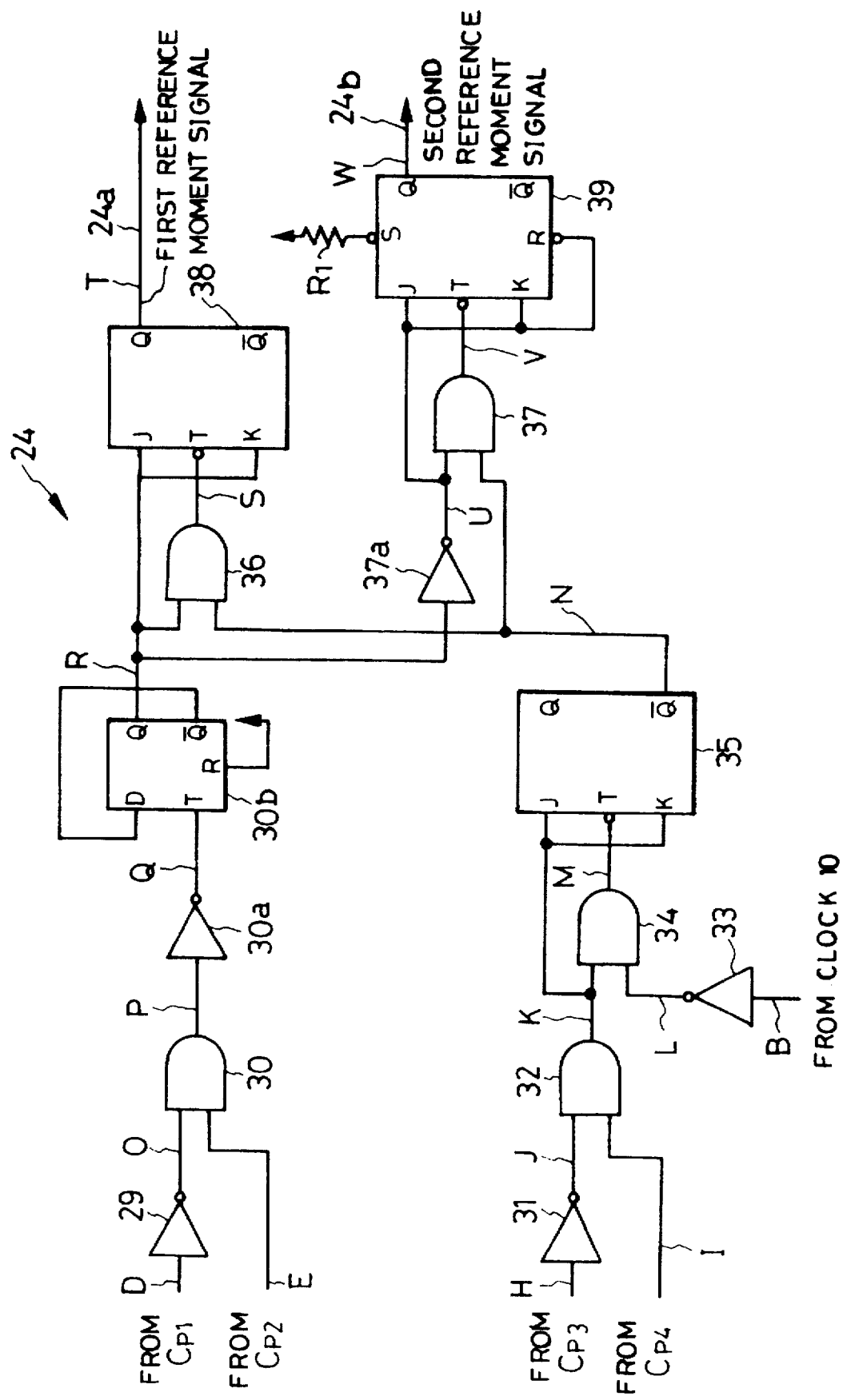
FIG. 3 is a schematic electrical diagram showing the reference moment determination circuit of the FIG. 2 excitation control circuit in more detail.

FIG. 3 is a detailed illustration of the reference moment determination circuit 24. It includes an inverter 29 having an input connected to the comparator $CP_1$, FIG. 2, and an output connected to one input of an AND gate 30, the other input of which is connected directly to the comparator $CP_2$. The output of the AND gate 30 is connected via another inverter 30a to the trigger or clock input T of a D flip flop 30b. Having its inverting output connected to its data input D, this flip flop functions as trigger flip flop.

The positive phase output Q of the flip flop 30b is connected to s the J and K inputs of a JK flip flop 38, to an AND gate 36, and to the J, K and R inputs of another JK flip flop 39 via an inverter 37a The output of this inverter 37a is connected to another AND gate 37 and thence to the clock input T of the flip flop 39. The output of the AND gate 36 is also connected to the clock input T of the first recited JK flip flop 38. The set input S of the JK flip flop 39 is connected to the power supply, not shown in this figure, via a resistor $R_1$. The Q outputs of the JK flip flops 38 and 39 are both connected to the excitation control signal forming circuit 12 by way of the output lines 24a and 24b.

The reference moment determination circuit 24 further includes an inverter 31 having an input connected to the comparator $CP_3$, FIG. 2, and an output connected to one input of an AND gate 32, the other input of which is connected directly to the comparator $CP_4$. The output of the AND gate 32 is connected to both J and K inputs of still another JK flip flop 35, and via an AND gate 34, to its clock input T The AND gate 34 has its other input connected to the clock 10, FIG. 2, via an inverter 33. The JK flip flop 35 has its inverting output connected to the noted AND gates 36 and 37.

Figure 14:
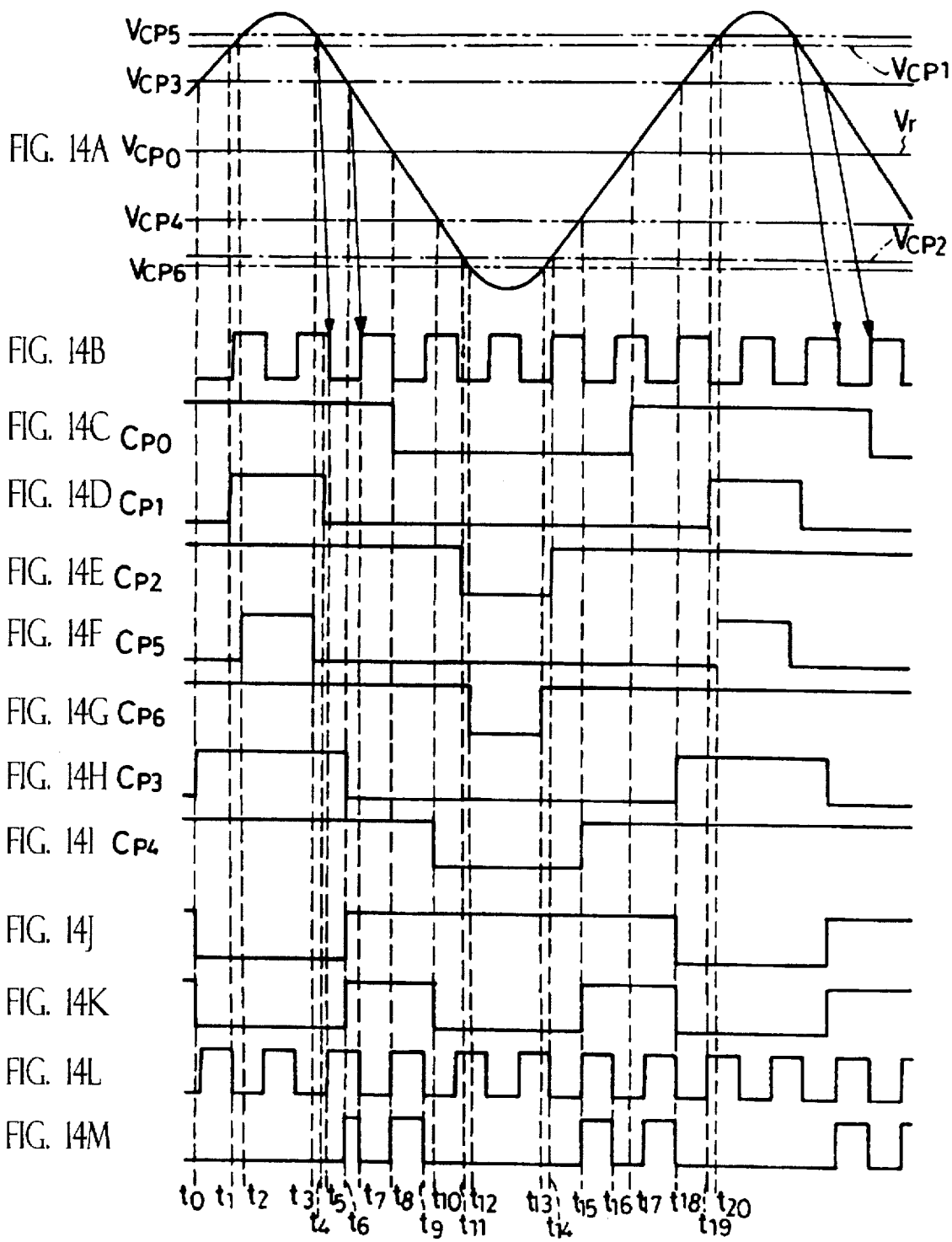
FIG. 14, consisting of (A) through (M), is a series of diagrams showing voltage waveforms appearing at various parts of FIGS. 2, 3 and FIG. 6.
Figure 15:
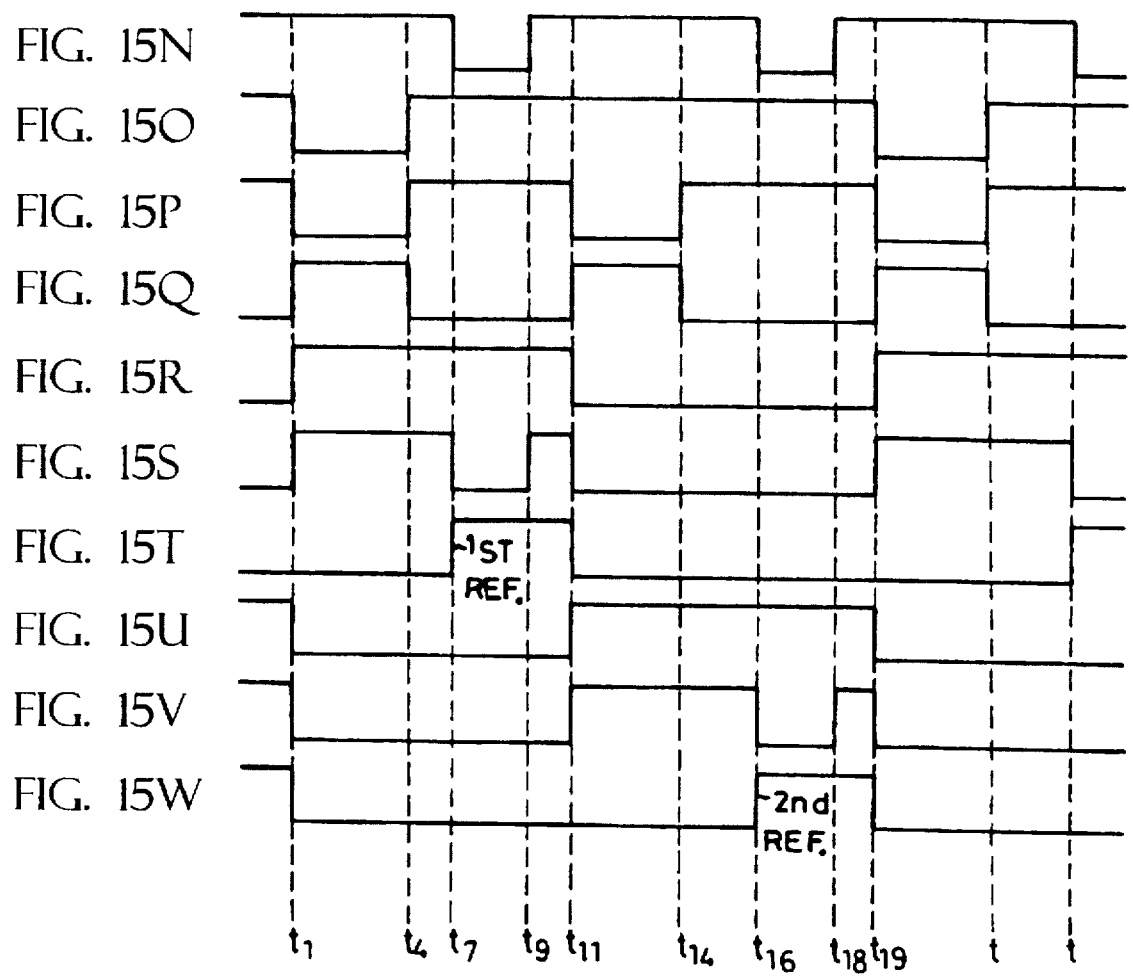
FIG. 15, consisting of (N) through (W), is a series of diagrams showing voltage waveforms appearing at various parts of FIG. 3.

The operation of the reference moment determination circuit 24 will be best understood by referring also to FIGS. 14 and 15 which show at (A) through (W) the waveforms appearing at correspondingly designated parts in FIGS. 2 and 3 and which are shown divided into two sheets for convenience only.

At (A) in FIG. 14 is shown the alternating Hall sensor output together with the various associated voltage levels. The comparators $CP_1$–$CP_4$, FIG. 2, provide pulses, indicated at (D), (E), (H) and (I) in FIG. 14, switching from one state to the other as the rotor position signal crosses their threshold levels or reference voltages $Vcp_1$–$Vcp_2$. All these output pulses of the comparators $CP_1$–$CP_4$ are input to the reference moment determination circuit 24.

In the reference moment determination circuit 24 the inversion, FIG. 15(O), of the FIG. 14(D) output from the comparator $CP_1$ and the FIG. 14(E) output from the comparator $CP_2$ are both directed into the AND gate 30, resulting in the AND gate output signal indicated at (P) in FIG. 15. After being inverted into the FIG. 15(Q) waveform, this AND gate output signal is directed to the clock input T of the D flip flop 30b, which functions as trigger flip flop because its inverting output is connected to its data input D. The noninverting output from the flip flop 30b is therefore as depicted at (R) in FIG. 15, switching from one stable state to the other in response to the leading edge of each incoming pulse. This flip flop output is delivered to the AND gate 36, the inverter 37a, and the J and K inputs of the flip flop 38.

The inversion, FIG. 14(J), of the FIG. 14(H) output from the comparator $CP_3$ and the FIG. 14(I) output from the comparator $CP_4$ are both directed into the AND gate 32, which then puts out the waveform of FIG. 14(K) for delivery to the AND gate 34 and the J and K inputs of the flip flop 35. The AND gate 34 also inputs the FIG. 14(L) inversion of the FIG. 14(B) clock pulses, thereby putting out the waveform of FIG. 14(M) for delivery to the trigger input T of the flip flop 35. Therefore, as indicated at (N) in FIG. 15, the inverting output of the flip flop 35 will go low at $t_7$, and then high at $t_9$.

Inputting this FIG. 15(N) output from the flip flop 35 and the FIG. 15(R) output from the flip flop 30b, the AND gate 36 puts out the waveform of FIG. 15(S). Consequently, as shown at (T) in FIG. 15, the flip flop 38 goes high at $t_7$ by being triggered by the FIG. 15(S) output pulse of the AND gate 36, and goes low at $t_{11}$ when the FIG. 15(R) output from the flip flop 30b goes low. This FIG. 15(T) output from the flip flop 38, obtained on the output line 24a of the circuit 24, is the first reference moment signal indicative of the first reference point which in this case is $t_7$.

The AND gate 37 also inputs the FIG. 15(N) output from the flip flop 35 as well as the FIG. 15(U) waveform. The resulting output from the AND gate 37 is therefore as shown at (V) in FIG. 15. Thus the flip flop 39 goes high at $t_{16}$ when its trigger input goes low while its J and K inputs are both high, and goes low at $t_...$ when its J and K inputs go low. This FIG. 15(W) output from the flip flop 39, obtained on the other output line 24b of the circuit 24, is the second reference moment signal indicative of the second reference moment $t_{16}$.

With reference back to FIG. 2 the start switch 13 is connected to the +V supply terminal via a resistor $R_5$ on one hand and, on the other hand, to the MMV 14 via the OR gate 14b. The start signal is shown at (B) in FIG. 12 to go low at to upon closure of the start switch 13. The MMV 14 will respond to this start signal by delivering a start pulse to the excitation control signal forming circuit 12. This start pulse determines by its duration the period of time during which startup control is performed, which differs from normal state control to be conducted following the startup period.

As shown also in FIG. 2, the restart circuit 15 comprises three MMVs 25, 26 and 28a, an OR gate 27, and a timer 28. The MMVs 25 and 26 have their inputs connected to the comparator $CP_0$, and their outputs to the OR gate 27. The MMV 25 puts out a pulse when the Hall sensor output crosses zero in the positive direction, and the MMV 26 puts out a pulse when the Hall sensor output crosses zero in the negative direction. The output pulses of both MMVs 25 and 26 have their duration predetermined to equal from a half cycle to one cycle of the Hall sensor output. Consequently, since the MMVs 25 and 26 alternately produce pulses as long as the motor starts up normally, the OR gate 27 will remain high.

The output of the OR gate 27 is connected via the timer 28 and MMV 28a to the OR gate 14b which has its other input connected as aforesaid to the start switch 13. The timer 28 is activated upon closure of the start switch 13 to monitor the output from the OR gate 27. The timer 28 internally produces an operation control signal which remains high during timer operation, which is slightly more than the control period by the MMV 14. It is understood that the timer 28 has an inbuilt NOR gate, not shown, which inputs both the internal operation control signal and the output from the OR gate 27. The timer produces the output from this NOR gate. Connected between timer 28 and OR gate 14b, the MMV 28a puts out a restart pulse as required according to the output from the timer 28. Normally, the MMV 28a is low.

In the operation of the restart circuit 15 one input to the OR gate 14 will go low upon closure of the start switch 13. Since the other input to the OR gate 14 is now low, the MMV 14 will respond to the start signal by delivering a control signal to the excitation control signal forming circuit 12. The start signal will also be applied to the MMVs 25 and 26 and to the timer 28 thereby resetting the same.

Let us assume that the motor has started up normally. Either MMV 25 or 26 will go high, causing the OR gate 27 to go high, when the comparator $CP_0$ detects the zero crossing of the Hall sensor output during the production of a start pulse by the MMV 14. Therefore, when the operation control signal of the timer 28 goes low upon lapse of a preassigned length of time following the closure of the start switch, its inbuilt NOR gate will remain low. The MMV 28a will therefore not produce a restart pulse, holding the OR gate 27 low.

The motor may fail to start normal rotation. In event the comparator $CP_0$ does not detect the zero crossing of the Hall sensor output during pulse production by the MMV 14, the MMV 25 or 26 will remain low, and so will the OR gate 27. However, the operation control signal of the timer 28 will go low upon lapse of the preset time after the closure of the start switch, so that its NOR gate will go high, causing the MMV 28a to put out a restart pulse. The OR gate 14b will temporarily go high in response to the leading edge of the restart pulse, thereby making the MMV 14 standing by. Then, in response to the trailing edge of the restart pulse, the OR gate 14b will go low to cause the MMV 14 to deliver a restart pulse to the excitation control signal forming circuit 12.

Figure 12:
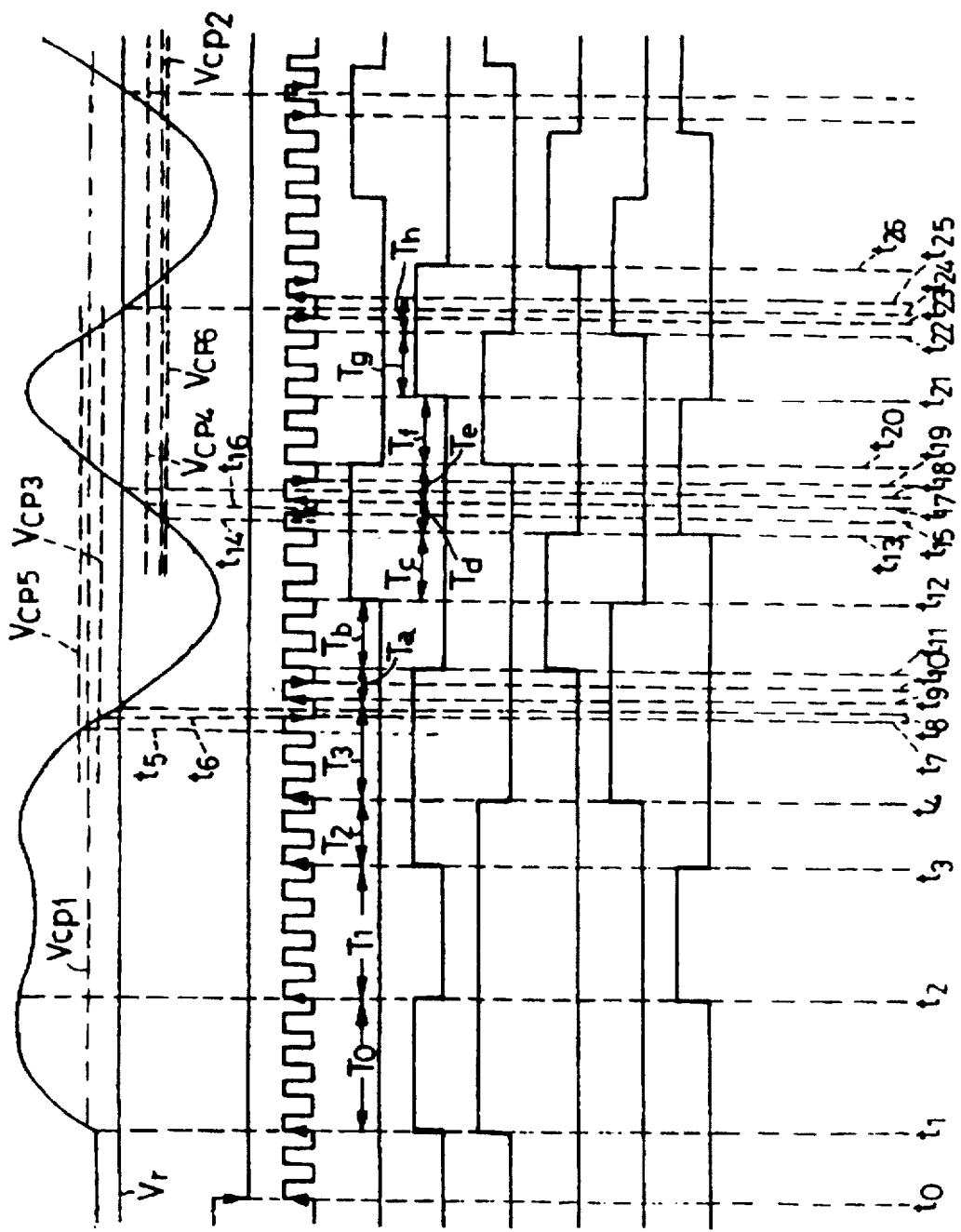
FIG. 12, consisting of (A) through (I), is a series of waveform diagrams useful in explaining the operation of the FIG. 1 motor control system during a startup period.

The excitation control signal forming circuit 12 produces the three phase excitation control signals $Su_1$, $Su_2$, $Sv_1$, $Sv_2$, $Sw_1$ and $Sw_2$ shown at (D)–(I) in FIG. 12. These signals are produced as the circuit 12 determines time spacings Ta, Tb and Tc from the first reference moment to in FIG. 12, that is, moments $t_{11}$, $t_{12}$ and $t_{13}$, and time spacings Td, Te, Tf and Tg from the second reference moment $t_{17}$, that is, moments too, $t_{21}$ and $t_{22}$.

Figure 13:
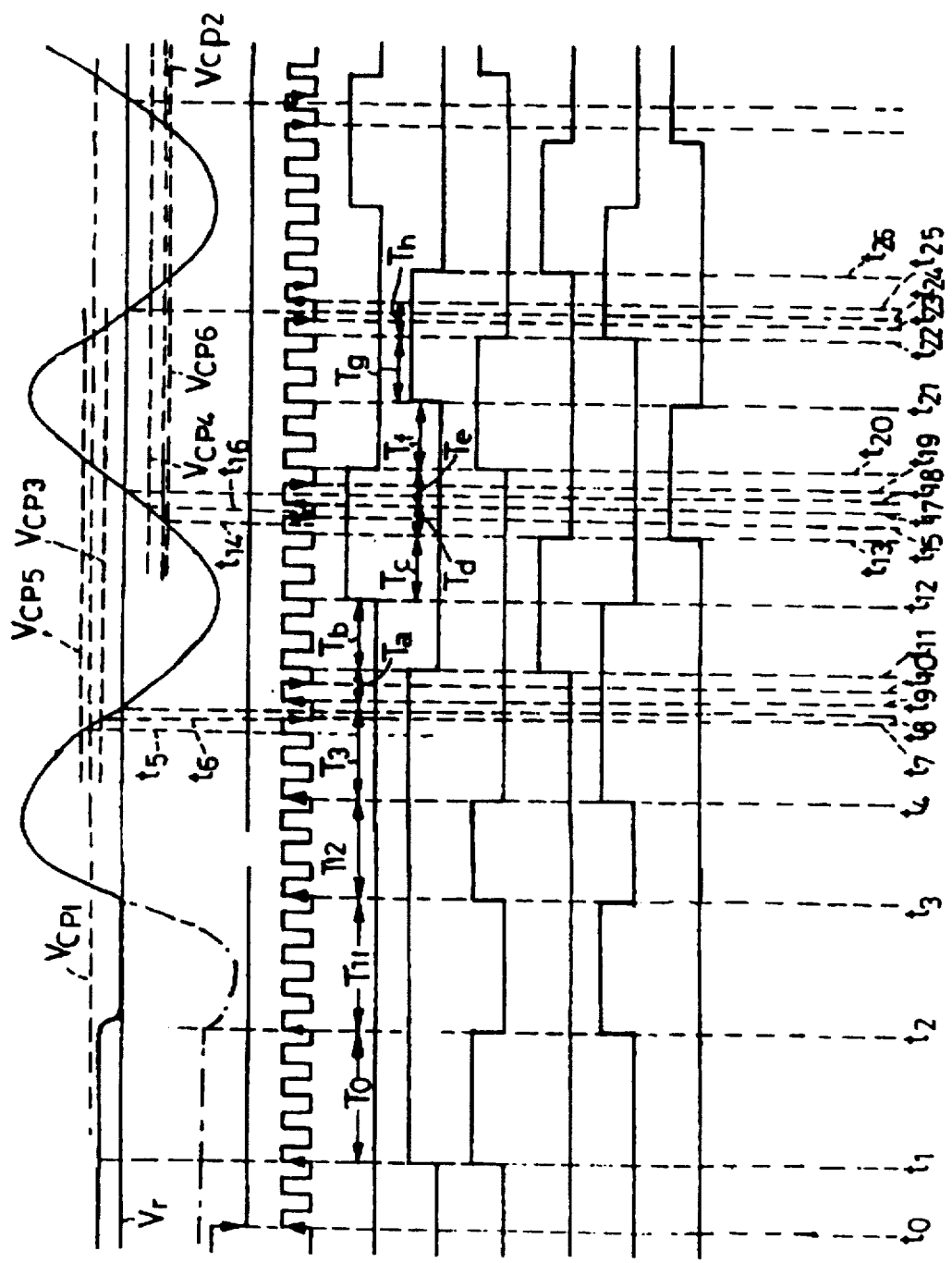
FIG. 13, consisting of (A) through (I), is a series of waveform diagrams useful in explaining the operation of the FIG. 1 motor control system in event a trouble occurs during the startup period.

The excitation control signals $Su_1$, $Su_2$, $Sv_1$, $Sv_2$, $Sw_1$ and $Sw_2$ differ before and after the moment $t_8$ when the rotor position signal, (A) in FIGS. 12 and 13, due to the single Hall sensor, first crosses the reference level (zero level of the alternating current) Vr. The method of startup excitation also differs depending upon whether the rotor 1 rotates upon commencement of motor excitation. At (D)–(I) in FIG. 12 are shown the waveforms of the excitation control signals produced in event the magnitude of the rotor position signal equals or exceeds the reference voltage $Vcp_1$ of the comparator $CP_1$ after the preselected signals $Su_2$ and $Sv_1$ are made high at the start of excitation. FIG. 13 shows at (D)–(I), on the other hand, the waveforms of the excitation control signals produced in event the magnitude of the rotor position signal falls short of the reference voltage $Vcp_1$ of the comparator $CP_1$ after the preselected signals $Su_2$ and $Sv_1$ are made high at the start of excitation, because the rotor makes little or no rotation.

How the excitation control signals $Su_1$, $Su_2$, $Sv_1$, $Sv_2$, $Sw_1$ and $Sw_2$ are produced will be explained in more detail hereinbelow, first with reference to FIG. 12 and then to FIG. 13.

The switching control signals $Su_2$ and $Sv_1$ are both made high, as at (E) and (F) in FIG. 12, in order to cause conduction through the transistors $Qu_2$ and $Qv_1$, FIG. 1, during the $t_1$–$t_2$ period $T_0$ which comes shortly after the start signal has gone low at to, as at (B) in FIG. 12. The other excitation control signals $Su_1$, $Sv_2$, $Sw_1$ and $Sw_2$ are all held low as at (D), (G), (H) and (I) in FIG. 12. The period $T_0$ should be not more than half the cycle time of the rotor position signal during the normal rotation of the rotor 1, being a quarter of that cycle time in this particular embodiment.

Figure 10:
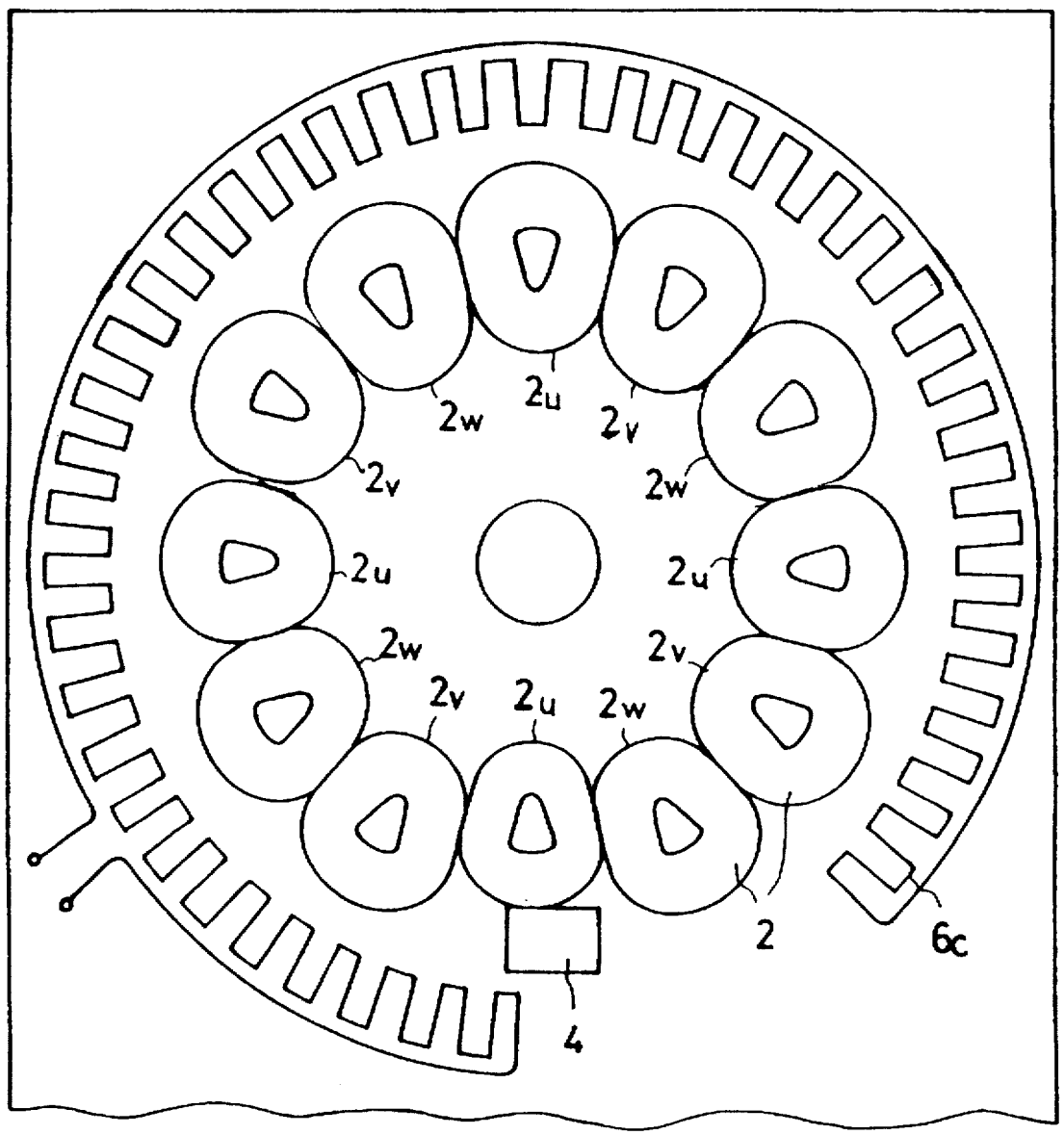
FIG. 10 is a diagram showing the stator windings, Hall speed sensor, and speed sensor windings of the FIG. 1 motor.

The excitation control signals $Sv_1$ and $Su_2$ are chosen as initial excitation signals, as above, because that stator windings are predetermined to be initially excited which are disposed within an electrical angle of 180 degrees in the forward direction from the location of the Hall sensor 4, which is shown disposed adjacent one U phase winding $2u$ in FIG. 10.

Then, during the $t_2$–$t_3$ period $T_1$, the excitation control signals $Sv_1$ and $Sw_2$ are made high, and the other signals $Su_1$, $Su_2$, $Sv_2$ and $Sw_1$ low, in order to cause conduction through the transistors $Qv_1$ and $Qw_2$. The period $T_1$ should also be not more than half the cycle time of the rotor position signal during normal rotor rotation and is also a quarter of that cycle time in this particular embodiment.

I Then, during the $t_3$–$t_4$ period $T_2$, the excitation control signals $Su_2$ and $Sv_1$ are made high, and the other signals $Su_1$, $Sv_2$, $Sw_1$ and $Sw_2$ low, in order to cause conduction through the transistors $Qu_2$ and $Qv_1$. The period $T_2$ should also be not more than half the cycle time of the rotor position signal during normal rotor rotation and is one eighth of that cycle time in this particular embodiment.

Then, during the $t_4$–$t_9$ period $T_3$, the excitation control signals $Su_2$ and $Sw_1$ are made high, and the other signals $Su_1$, $Sv_1$, $Sv_2$ and $Sw_2$ low, in order to cause conduction through the transistors $Qu_2$ and $Qw_1$. The period $T_3$ terminates at the first reference moment $t_9$. The excitation control signals supplied before this moment $t_9$, that is, during the startup period, differ in waveform from those supplied thereafter, that is, during normal motor rotation.

The normal excitation control signals, supplied after the first reference moment $t_9$, are such that the transistors $Qu_1$, $Qv_1$ and $Qw_1$ are successively turned on at spacings of 120 degrees, and so are the other transistors $Qu_2$, $Qv_2$ and $Qw_2$. More specifically, during the $t_9$–$t_{11}$ period Ta, the excitation control signals $Su_2$ and $Sw_1$ are made high, and the other signals $Su_1$, $Sv_1$, $Sv_2$ and $Sw_2$ low, in order to hold the transistors $Qu_2$ and $Qw_1$ conductive in continuation from the $t_4$–$t_9$ period $T_3$. The period Ta is approximately equal to the time for the rotor to rotate through the angle, 30 degrees in the illustrated embodiment, from the centers of the U phase stator windings $2u$ to the center of the Hall sensor 4.

Then, during the $t_{11}$–$t_{12}$ period Tb, the excitation control signals $Sv_2$ and $Sw_1$ are made high, and the other signals $Su_1$, $Su_2$, $Sv_1$ and $Sw_2$ low, in order to cause conduction through the transistors $Qv_2$ and $Qw_1$. The period Tb corresponds to one sixth (60 degrees) of one cycle of the rotor position signal during normal motor rotation.

Then, during the $t_{12}$–$t_{12}$ period Tc, the excitation control signals $Su_1$ and $Sv_2$ are made high, and the other signals $Su_2$, $Sv_1$, $Sw_1$ and $Sw_2$ low, in order to cause conduction through the transistors $Qu_1$ and $Qv_2$. The period Tc also corresponds to one sixth of one cycle of the rotor position signal during normal motor rotation.

Then, during the $t_{13}$–$t_{17}$ period Td and $t_{17}$–$t_{20}$ period Te, the $t_{17}$ being the second reference moment, the excitation control signals $Su_1$ and $Sw_2$ are made high, and the other signals $Su_2$, $Sv_1$, $Sv_2$ and $Sw_1$ low, in order to cause conduction through the transistors $Qu_1$ and $Qw_2$. The $t_{13}$–$t_{20}$ period (Td+Te) also corresponds to one sixth of one cycle of the rotor position signal during normal motor rotation. However, the period Td is indefinite because the second reference moment $t_{17}$ is indefinite. The period Te is determined like the period Ta.

Then, during the $t_{20}$–$t_{21}$ period Tf, the switching control signals $Sv_1$ and $Sw_2$ are made high, and the other signals $Su_1$, $Su_2$, $Sv_2$ and $Sw_1$ low, in order to cause conduction through the transistors $Qv_1$ and $Qw_2$. The period Tf also corresponds to one sixth of one cycle of the rotor position signal during normal motor rotation.

Then, during the $t_{21}$–$t_{22}$ period Tg, the switching control signals $Su_2$ and $Sv_1$ are made high, and the other signals $Su_1$, $Sv_2$, $Sw_1$ and $Sw_2$ low, in order to cause conduction through the transistors $Qu_2$ and $Qv_1$. The period Tg also corresponds to one sixth of one cycle of the rotor position signal during normal motor rotation.

Then, during the period Th from moment $t_{22}$ to another first reference moment of $t_{24}$, the switching control signals $Su_2$ and $Sw_1$ are made high, and the other signals $Su_1$, $Sv_1$, $Sv_2$ and $Sw_2$ low, in order to cause conduction through the transistors $Qu_2$ and $Qw_1$. The period Th also corresponds to one sixth of one cycle of the rotor position signal during normal motor rotation.

The above described control process during the $t_9$–$t_{24}$ period is repeated after the moment $t_{24}$.

With reference now to FIG. 13, during the $t_1$–$t_2$ period To in this figure, the switching control signals $Su_2$ and $Sv_1$ are made high, and the other signals $Su_1$, $Sv_2$, $Sw_1$ and $Sw_2$ low, in order to cause conduction through the transistors $Qu_2$ and $Qv_1$, as in the same period To in FIG. 12.

Then, during the $t_2$–$t_3$ period $T_{11}$ in FIG. 13, the excitation control signals $Su_2$ and $Sw_1$ are made high, and the other signals $Su_1$, $Sv_1$, $Sv_2$ and $Sw_2$ low, in order to cause conduction through the transistors $Qu_2$ and $Qw_1$. The period $T_{11}$ is determined just like the period $T_1$ of FIG. 12.

Then, during the $t_3$–$t_4$ period $T_{12}$ in FIG. 13, the excitation control signals $Su_2$ and $Sv_1$ are made high, and the other signals $Su_1$, $Sv_2$, $Sw_1$ and $Sw_2$ low, in order to cause conduction through the transistors $Qu_2$ and $Qv_1$. The period $T_{12}$ is set at approximately one quarter of one cycle of the rotor position signal during normal motor rotation.

The control method after the moment $t_4$ in FIG. 13 is similar to that after the moment $t_4$ in FIG. 12.

Figure 4:
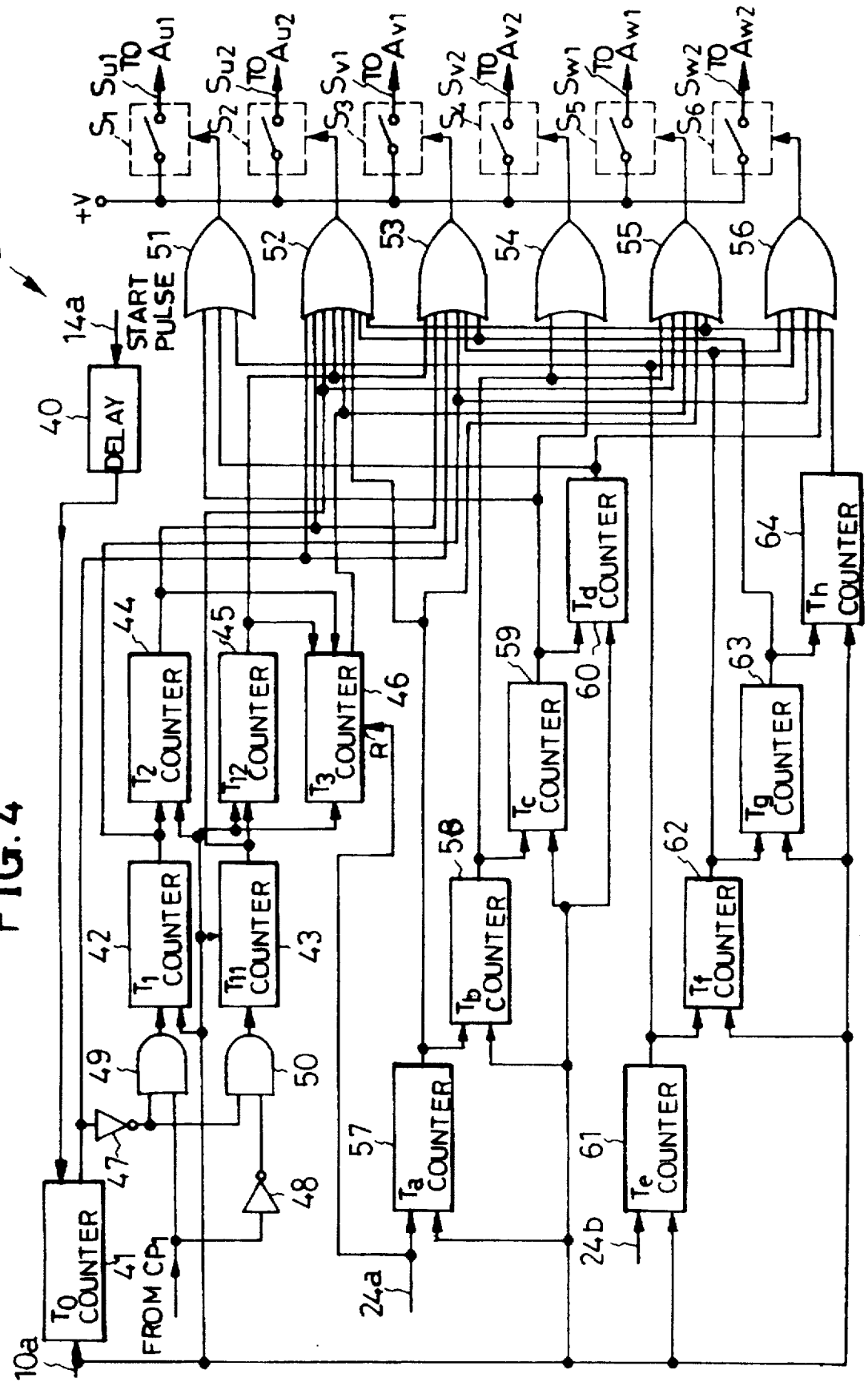
FIG. 4 is a schematic electrical diagram, partly in block form, showing the excitation control signal forming circuit of the FIG. 2 excitation control circuit in more detail.

The excitation control signal forming circuit 12, producing the signals set forth hereinbefore with reference to FIGS. 12 and 13, is illustrated in detail in FIG. 4. Broadly, this circuit 12 is comprised of startup signal means for providing the six excitation control signals $Su_1$, $Su_2$, $Sv_1$, $Sv_3$, $Sw_1$ and $Sw_2$ of the waveforms before the first reference moment $t_9$ in both FIGS. 12 and 13, and normal signal means for providing those of the waveforms after the moment $t_9$. These two circuit means will be detailed one after the other in the following.

The startup signal means of the excitation control signal forming circuit 12 comprises a delay circuit 40, six counters 41, 42, 43, 44, 45 and 46, two NOT circuits 47 and 48, and two AND gates 49 and 50. The delay circuit 40 has its input connected to the MMV 14, FIG. 2, by way of the start pulse line 14a and its output to the To counter 41. This counter has another input connected to the clock 10, FIG. 2, by way of the clock pulse line 10a. The delay circuit 40 delays the start signal, shown to go low at to in FIGS. 12 and 13, by an amount of time slightly less than the $t_0$–$t_1$ time interval. Activated by this delayed start signal, the $T_O$ counter 41 starts counting the clock pulses, shown at (C) in FIGS. 12 and 13, for the $t_1$–$t_2$ time interval $T_O$ and puts out a pulse indicative of that time interval.

Common to both startup signal means and normal signal means are six OR gates 51, 52, 53, 54, 55 and 56, six switches $S_1$, $S_2$, $S_3$, $S_4$, $S_5$ and $S_6$. Connected the output lines of the six excitation control signals $Su_1$, $Su_2$, $Sv_1$, $Sv_2$, $Sw_1$ and $Sw_2$ to a supply terminal +V, these switches are open (excitation control signals low) when the OR gates 51–56 are low, and are closed (excitation control signals high) when the OR gates are high. The output of the $T_0$ counter 41 is connected to the OR gates 52 and 53. The switches $S_2$ and $S_3$ will therefore be closed when the OR gates 52 and 53 go high in response to the counter output, thereby causing the excitation control signals $Su_2$ and $Sv_1$ to go high. The other switching control signals will remain low as the other switches are held open.

The output of the $T_0$ counter 41 is additionally connected to the control input of the $T_1$ counter 42 via the NOT circuit 47 and AND gate 49. The AND gate 49 has another input connected to the comparator $CP_1$, FIG. 2. The $T_1$ counter 42 is therefore driven to count the clock pulses both when the comparator output is high, indicating that the rotor position signal is higher than the reference voltage $Vcp_1$, and when the $T_0$ counter output is low, as after $t_2$ in FIG. 12. The $T_1$ counter 42 will be high as long as it is counting the clock pulses for the $t_2$–$t_3$ time interval $T_1$. The output of the $T_1$ counter 42 is connected to both OR gates 53 and 56. The switches $S_3$ and $S_6$ will therefore be closed during the $t_2$–$t_3$ time interval $T_1$, making the excitation control signals $Sv_1$ and $Sw_2$ high as in FIG. 12.

Having its control terminal connected to the output of the $T_1$ counter 42, the $T_2$ counter 44 will start counting the clock pulses when the $T_1$ counter goes low, and remain high for the time interval $T_2$. The output of the $T_2$ counter 44 is connected to both OR gates 52 and 53. The switches $S_2$ and $S_3$ will therefore be closed during the $t_2$–$t_3$ time interval in FIG. 12, making the excitation control signals $Su_2$ and $Sv_1$ high.

The $T_3$ counter 46 has two control terminals connected to the outputs of the $T_2$ counter 44 and $Ti_{12}$ counter 45, and a reset terminal connected to the first reference moment signal line 24a. Thus the $T_3$ counter 46 will start counting upon expiration of either an output pulse of $T_2$ duration from the $T_2$ counter 44 or of an output pulse of $T_{12}$ duration from the $T_{12}$ counter 45 and stop counting at the first reference moment $t_9$, thereby producing a pulse during the $t_4$–$t9$ period $T_3$ in both FIGS. 12 and 13. The output of the $T_3$ counter 46 is connected to both OR gates 52 and 55. The switches $S_2$ and $S_5$ will therefore be closed during the $t_4$–$t_9$ time interval in both FIGS. 12 and 13, making the excitation control signals $Su_2$ and $Sw_1$ high.

The AND gate 50 has one input connected to the $T_0$ counter 41 via the inverter 47, another input to the comparator $CP_1$, FIG. 2, via the inverter 48, and an output to the control terminal of the $T_{11}$ counter 43. The AND gate 50 will therefore go high when the $T_0$ counter 41 stops counting, as at $t_2$ in FIG. 13, if then the comparator $CP_1$ is low. Thus driven by the AND gate 50, the $T_{11}$ counter 43 will start counting the clock pulses at $t_2$, producing a pulse of $T_{11}$ duration. The output of the $T_{11}$ counter 43 is connected to both OR gates 52 and 55. The switches $S_2$ and $S_5$ will be closed during the $t_2$–$t_3$ time interval in FIG. 13, making the excitation control signals $Su_2$ and $Sw_1$ high.

Having a control terminal connected to the $T_{11}$ counter 43, the $T_{12}$ counter 45 will start counting when the $T_{11}$ counter goes low, and stop counting upon lapse of the $T_{12}$ time interval. The output of the $T_{12}$ counter 45 is connected to both OR gates 52 and 53, so that the switches $S_2$ and $S_3$ will be closed during the $t_3$–$t_4$ time interval in FIG. 13, making the switch control signals $Su_2$ and $Sv_1$ high.

The normal signal means of the excitation control signal forming circuit 12 comprises the remaining eight counters 57–64 of FIG. 4, all having inputs connected to the clock pulse line 10a, in addition to the OR gates 51–56 and the switches $S_1$–$S_6$. All these counters function to provide the waveforms of the excitation control signals $Su_1$–$Sw_2$ after the moment $t_9$ in FIGS. 12 and 13, as has been mentioned and will be detailed hereafter.

The Ta counter 57 has its control terminal connected to the first reference moment line 24a, so that this counter will start counting the clock pulses at the first reference moment $t_9$ in both FIGS. 12 and 13 and continue to do so for the period Ta. The high output produced by the Ta counter during this time interval will be applied to both OR gates 52 and 55, thereby causing the switches $S_2$ and $S_5$ to be closed and making the excitation control signals $Su_2$ and $Sw_1$ high during the $t_9$–$t_{11}$ time interval in FIGS. 12 and 13.

The Tb counter 58 has its control terminal connected to the Ta counter 57, so that the Tb counter will start counting when the Ta counter stops counting, producing a high output for the period Tb thereafter. The high output from the Tb counter will be applied to both OR gates 54 and 55, thereby causing the switches $S_4$ and $S_5$ to be closed and making the excitation control signals $Sv_2$ and $Sw_1$ high during the $t_{11}$–$t_{12}$ time interval in FIGS. 12 and 13.

The Tc counter 59 has its control terminal connected to the Tb counter 58, so that the Tc counter will start counting when the Tb counter stops counting, producing a high output for the period Tc thereafter. The high output from the Tc counter will be applied to both OR gates 51 and 55, thereby causing the switches $S_1$ and $S_4$ to be closed and making the excitation control signals $Su_1$ and $Sv_2$ high during the $t_{12}$–$t_{13}$ time interval in FIGS. 12 and 13.

The Td counter 60 has its control terminal connected to the Tc counter 59, so that the Td counter will start counting when the Tc counter stops counting, producing a high output for the period Td thereafter. The high output from the Td counter will be applied to both OR gates 51 and 56, thereby causing the switches $S_1$ and $S_6$ to be closed and making the excitation control signals $Su_1$ and $Sw_2$ high during the $t_{13}$–$t_{17}$ time interval in FIGS. 12 and 13.

The Te counter 61 has its control terminal connected to the second reference moment line 24b, so that the Te counter will start counting at the second reference moment $t_{17}$, producing a high output for the period Te thereafter. The high output from the Te counter will be applied to both OR gates 51 and 56, thereby causing the switches $S_1$ and $S_6$ to be closed and making the excitation control signals $Su_1$ and $Sw_2$ high during the $t_{17}$–$t_{20}$ time interval in FIGS. 12 and 13.

The Tf counter 62 has its control terminal connected to the Te counter 61, so that the Tf counter will start counting when the Te counter stops counting, producing a high output for the period Tf thereafter. The high output from the Tf counter will be applied to both OR gates 53 and 56, thereby causing the switches $S_3$ and $S_6$ to be closed and making the excitation control signals $Sv_1$ and $Sw_2$ high during the $t_{20}$–$t_{21}$ time interval.

The Tg counter 63 has its control terminal connected to the Tf counter 62, so that the Tg counter will start counting when the Tf counter stops counting, producing a high output for the period Tg thereafter. The high output from the Tg counter will be applied to both OR gates 52 and 53, thereby causing the switches Sa and $S_3$ to be closed and making the excitation control signals $Su_2$ and $Sv_1$ high during the $t_{21}$–$t_{22}$ time interval in FIGS. 12 and 13.

The Th counter 64 has its control terminal connected to the Tg counter 63, so that the Th counter will start counting when the Tg counter stops counting, producing a high output for the period Th thereafter. The high output from the Th counter will be applied to both OR gates 52 and 55, thereby causing the switches $S_2$ and $S_5$ to be closed and making the excitation control signals $Su_2$ and $Sw_1$ high during the $t_{22}$–$t_{24}$ time interval.

Figure 5:
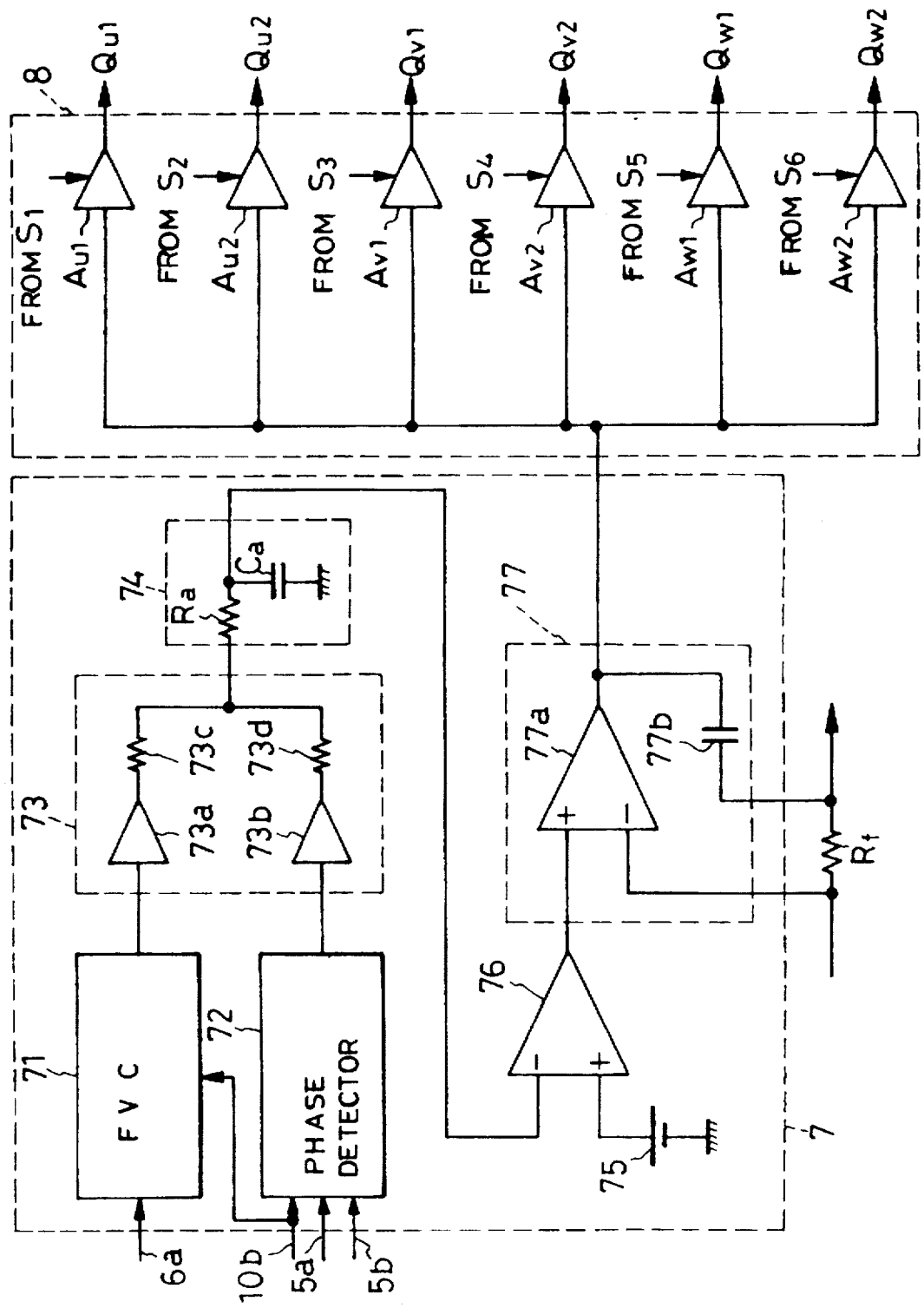
FIG. 5 is a schematic electrical diagram, partly in block form, showing the speed control signal forming circuit and transistor control circuit of the FIG. 1 motor control system in more detail.

The output lines of the FIG. 4 excitation control signal forming circuit 12 are all connected to the control terminals of drive amplifiers $Au_1$, $Au_2$, $Av_1$, $Av_2$, $Aw_1$ and $Aw_2$ of the transistor control circuit 8 shown in detail in FIG. 5. A reference back to FIG. 1 will reveal that the outputs of the drive amplifiers $Au_1$–$Aw_2$ are connected to the bases of the transistors $Qu_1$–$Qw_2$ of the excitation circuit 3 in order to cause selective conduction therethrough as dictated by the excitation control signals $Su_1$–$Sw_2$ of the FIGS. 12 and 13 waveforms.

FIG. 5 also shows the speed control circuit 7 in detail, which is connected to the inputs of all the amplifiers $Au_1$–$Aw_2$ of the transistor control circuit 8 for the speed control of the FIG. 1 motor. Broadly, the speed control circuit 7 comprises a frequency to voltage converter (FVC) 71, a phase detector 72, a circuit 73 for combining the motor speed signal and the motor phase signal, a smoothing (integrating) circuit 74, a reference voltage source 75, a differential amplifier 76, and a current limiter 77.

Figure 8:
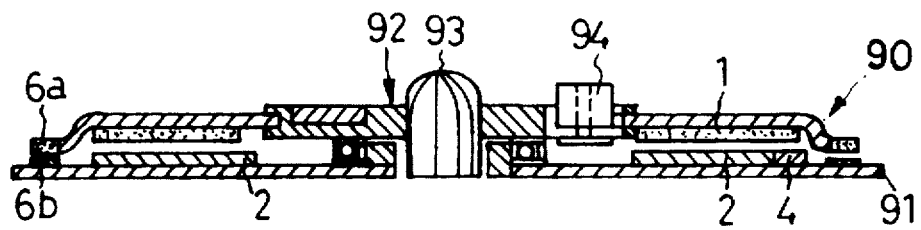
FIG. 8 is an enlarged, partial section through the FIG. 7 disk drive, the section being taken through the turntable axis.
Figure 11:
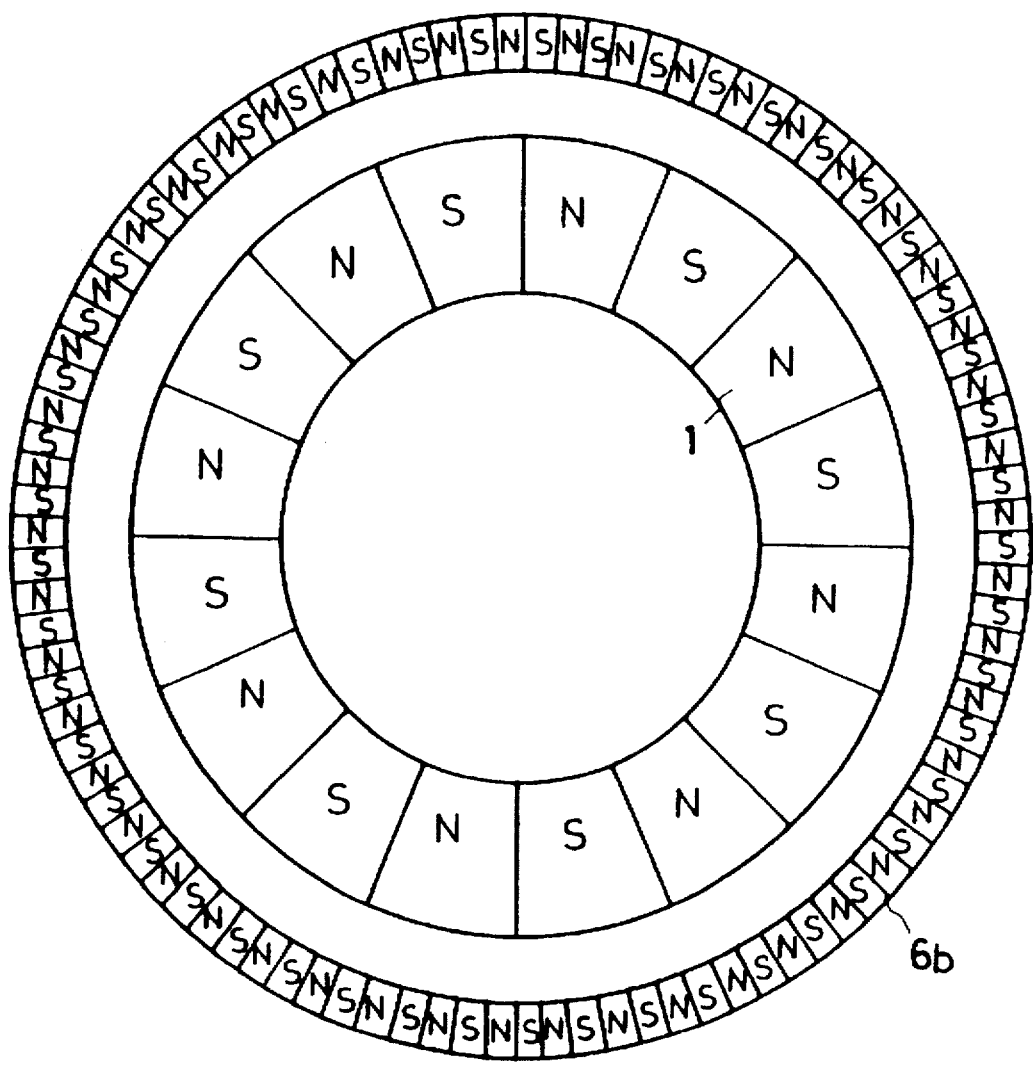
FIG. 11 is a diagram showing the rotor and speed sensor magnet of the FIG. 1 motor.

Connected to the input of th FVC 71 is the output line 6a of the motor speed sensor 6, FIG. 1, which, as shown in one preferred form in FIGS. 8 and 11, comprises a permanent magnet 6b capable of rotation with the motor rotor 1, and speed sensing windings 6c, FIGS. 8 and 10. Annular in shape, the magnet 6a has a multiplicity of north and south seeking poles arranged alternately along its periphery. The speed sensing windings 6c is also generally annular in shape, disposed outside the stator windings 2, providing, upon rotation of the magnet 6b, with the rotor 1, a motor speed signal having a frequency representative of the rotational speed of the motor.

The FVC 71 conventionally translates the frequency of the motor speed signal into a voltage of corresponding magnitude. Toward this end the FVC utilizes the clock pulses, fed over the line 10b, after multiplying their repetition rate. Of course, instead of directing the external clock pulses into the FVC, an oscillator could be built into this circuit, and the oscillator output could be divided in frequency in order to provide the clock pulses of FIGS. 12 and 13 for use in the excitation control circuit 5 as well as the phase detector 72.

The phase detector 72 has three inputs connected to the rotor position signal line 5a, FIG. 2, to the output line 5b of the comparator $CP_0$, and to the clock pulse line 10b. The phase detector 72 puts out a signal representative of the phase difference between the output from the comparator $CP_0$, which indicates as aforesaid the moment the rotor position signal of FIG. 12(A) crosses the reference voltage Vr, and the clock pulses of FIG. 12(C).

Figure 6:
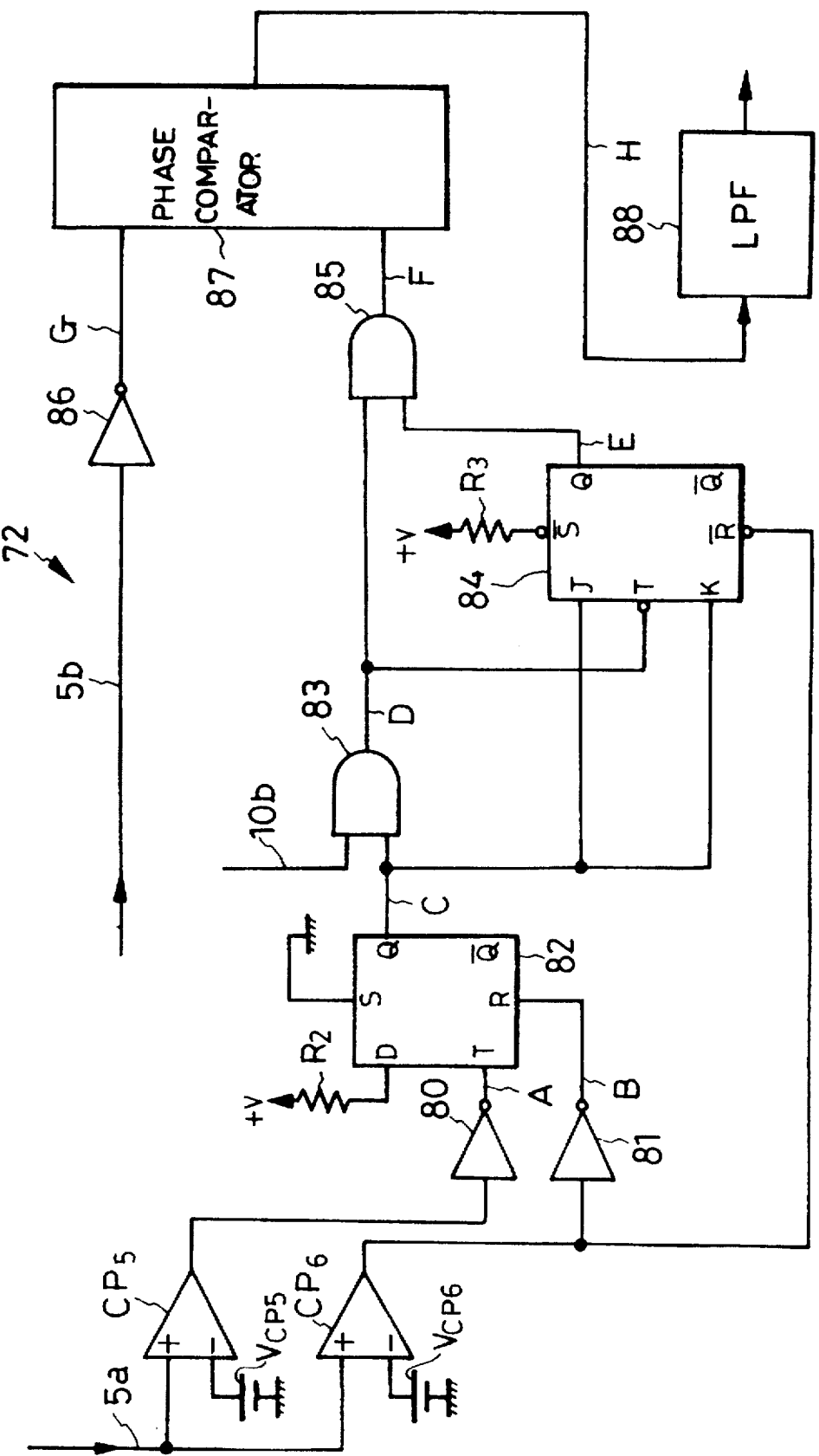
FIG. 6 is a schematic electrical diagram, partly in block form, showing the phase detector circuit of the FIG. 5 speed control signal forming circuit in more detail.

As illustrated in more detail in FIG. 6, the phase detector 72 has a pair of comparators $CP_5$ and $CP_6$ each having one input connected to the rotor position signal line 5a The other inputs of the comparators $CP_5$ and $CP_6$ are connected to reference voltage sources $Vcp_5$ and $Vcp_6$, respectively. As indicated at (A) in FIG. 14, the reference voltages $Vcp_5$ and $Vcp_6$ are predetermined to cross the positive and the negative half waves, respectively, of the rotor position signal. The comparators $CP_5$ and $CP_6$ provide, therefore, the pulses seen at (F) and (G) in FIG. 14.

The output of the comparator $CP_5$ is connected via an inverter 80 to the trigger input of a D flip flop 82. The output of the comparator $CP_6$ is connected via an inverter 81 to the reset input R of the flip flop 82, and directly to the inverting reset input of a JK flip flop 84. The D flip flop 82 has a data input D connected to the power supply +V via a resistor $R_2$, a set input S grounded, and an output Q connected both to an AND gate 83 and to both J and K inputs of the JK flip flop 84. The AND gate 83 has another input connected to the clock 10, FIG. 2, by way of the line 10b, and an output connected both to another AND gate 85 and to the trigger input T of the JK flip flop 84. This flip flop 84 has an inverting set input connected to the power supply +V via a resistor $R_3$, and a Q output connected to another input of the AND gate 85. The output of the AND gate 85 is connected to a phase comparator 87 which has another input connected via an inverter 86 to the output line 5b of the comparator $CP_0$, FIG. 2. The output of the phase comparator 87 is connected via a lowpass filter (LPF) 88 to the combining circuit 73, FIG. 5, of the speed control circuit 7.

Figure 16:
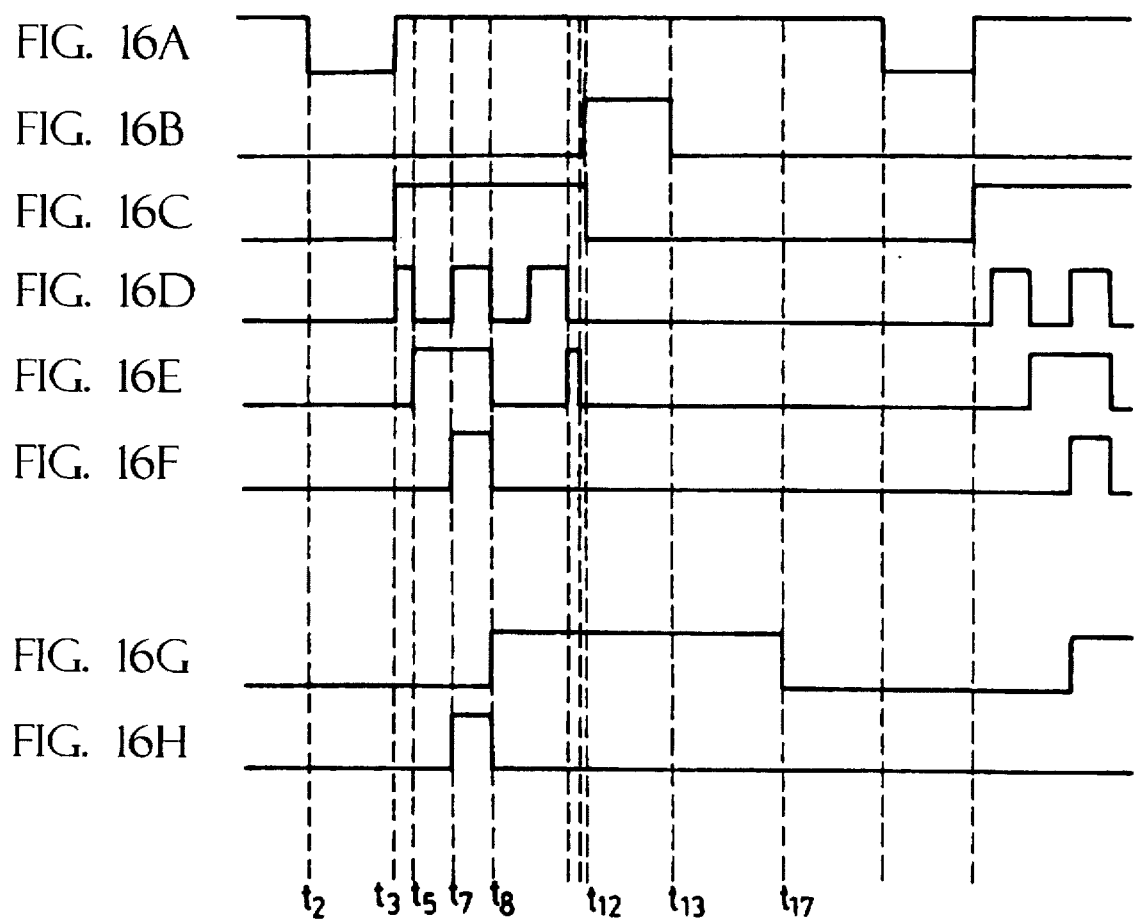
FIG. 16, consisting of (A) through (H), is a series of diagrams showing voltage waveforms appearing at various parts of the FIG. 6 phase detector circuit.

The operation of the phase detector circuit 72 will be best understood from FIG. 16 which shows at (A) through (H) the waveforms appearing at those parts of the FIG. 6 circuit which are designated by the same capitals. Also, the moments $t_2$–$t_{17}$ in FIG. 16 are the same as the moments $t_2$–$t_{17}$ in FIGS. 14 and 15.

Drawn at (A) and (B) in FIG. 16 are the inversions of the output waveforms of the comparators $CP_5$ and $CP_6$ which are suggestive of the positive and the negative half waves of the FIG. 14(A) rotor position signal As indicated at (C) in FIG. 16, the D flip flop 82 will go high at $t_3$ when the output from the inverter 80 goes high, and low at $t_{12}$ when the output from the other inverter 81 goes high. Inputting this flip flop output and the FIG. 14(B) clock pulses, the AND gate 83 will provide the FIG. 16(D) waveform.

Triggered by the trailing edge of the first output pulse from the AND gate 83, the JK flip flop 84 will go high at $t_5$, as at FIG. 16(E), and low at to in response to the trailing edge of the next pulse from the AND gate 83. This $t_5$–$t_8$ pulse from the flip flop 84 is indicative of that part of the FIG. 14(A) rotor position signal which crosses zero.

The AND gate 85 functions to select that one of the FIG. 16(D) pulses which comes synchronously with the $t_5$–$t_8$ pulse of FIG. 16(E), providing the FIG. 16(F) waveform. The pulses thus produced by the AND gate 85 are those clock pulses are closest in time to the moments the rotor position signal crosses zero.

Inputting the FIG. 16(F) waveform and the inversion, FIG. 16(G), of the FIG. 14(C) output from the comparator $CP_0$, the phase comparator 87 will put out the FIG. 16(H) waveform indicative of the phase or time difference between the leading edge, $t_7$, of each FIG. 16(F) pulse and the leading edge, $t_8$, of the corresponding FIG. 16(G) pulse. The duration of each output pulse from the phase comparator 87 is therefore in direct proportion to the phase difference between the two inputs. The output from the phase comparator 87 will be subsequently smoothed by the LPF 88 of conventional make comprising an amplifier, capacitor, and so forth, preparatory to delivery to the combining circuit 73, FIG. 5.

The combining circuit 73 is such that the FVC output line and the phase detector output line are joined via amplifiers 73a and 73b and resistors 73c and 73d The output of the combining circuit 73 is connected to the smoothing circuit 74 comprising a resistor Ra and a capacitor Ca, although this smoothing circuit could be an active filter employing an operational amplifier.

The output of the smoothing circuit 74 is connected to the differential amplifier 76, which has another input connected to the reference voltage source 75. This reference voltage is preset to represent the desired motor speed, so that the differential amplifier 76 puts out a voltage representative of the departure of the actual motor speed from the desired speed. This output voltage is sent via the current limiter 77 to the drive amplifiers $Au_1$–$Aw_2$ of the transistor control circuit 8.

The current limiter circuit 77 comprises an operational amplifier 77a having one input connected to the differential amplifier 76, and another input to its own output via a feedback capacitor 77b. Shown connected in series with the capacitor 77b is a resistor Rf which serves to detect the magnitude of the current being carried by the stator windings $2u$, $2v$ and $2w$, FIG. 1, of the motor. The amount being negatively fed back will increase should the stator current exceed a predetermined limit, thereby restricting the stator current.

The speed control signal thus obtained is directed into all the amplifiers $Au_1$–$Aw_2$ of the transistor control circuit 8, thereby to be applied to the bases of the associated transistors $Qu_1$–$Qw_2$, FIG. 1, of the excitation circuit 3 during the high states of the excitation control signals $Su_1$–$Sw_2$ impressed to their control terminals. The collector to emitter resistances of the transistors will vary with the voltage of the speed control signals, and so will the currents flowing through the stator windings $2u$, $2v$ and $2w$, holding the motor in rotation at constant speed.

Such being the improved motor control system according to the invention, the motor will pick up speed very quickly and be maintained precisely at the desired speed. These advantages results accrue from the combination of control based upon speed detection and that based upon phase detection. The phase detector circuit 72, FIGS. 5 and 6, produces no pulses during startup, so that the motor speed rises quickly under control based solely on the output from the speed sensor 6, FIG. 1. After the motor gained enough speed, however, more precise speed control is performed as control relying on actual motor speed is combined with that utilizing the relationship between the moments the rotor position signal crosses the reference level Vr and the phase of the clock pulses. Highly accurate and positive speed control of the three phase brushless motor is thus realized despite the use of but one Hall sensor 4. FIGS. 17–20 are explanatory of how the stator windings are excited during start up, and of the angular positions of the rotor. For simplicity these figures show the rotor as a bar magnet having but one pair of opposite poles, and the stator windings as being only three, angularly spaced 120 degrees from each other.

Figure 17:
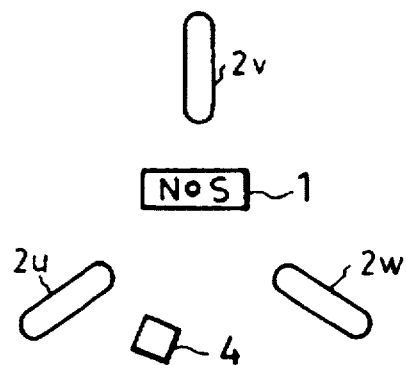
FIG. 17 schematically illustrates the relative positions of the rotor, stator windings, and Hall speed sensor of the FIG. 1 motor in order to explain how it is started up.

Assume that the rotor 1 is now at a standstill in the FIG. 17 position. Then, upon excitation of the stator windings $2u$, $2v$ and $2w$ according to the startup method of this invention, as during the periods $T_0$, $T_1$, $T_2$ and $T_3$ in FIG. 12, the rotor will rotate as depicted at (A) through (D) in FIG. 18 and then proceed to normal rotation after the moment $t_9$ in FIG. 12.

In FIG. 19 is shown the behavior of the rotor in the case where it makes little or no rotation in response to the initial excitation during the period $T_0$ in FIG. 13. As shown at (A) in FIG. 13, the alternating rotor position signal will not be obtained if the rotor does not rotate in response to the initial excitation. This is in contrast to the showing of FIG. 12(A) where the production of the rotor position signal begins at $t_1$ as the rotor immediately starts rotation in response to the initial excitation. The rotor position signal will remain less than the reference voltage $Vcp_1$ at the moment $t_2$ in the case of FIG. 13, so that the comparator $CP_1$, FIG. 2, will remain low thereby triggering the $T_{11}$ and $T_{12}$ counters 43 and 45, FIG. 4. The excitation control signals $Su_2$ and $Sw_1$ are therefore high during the period $T_{11}$, so that the rotor will be temporarily energized in the reverse direction.

Figure 9:
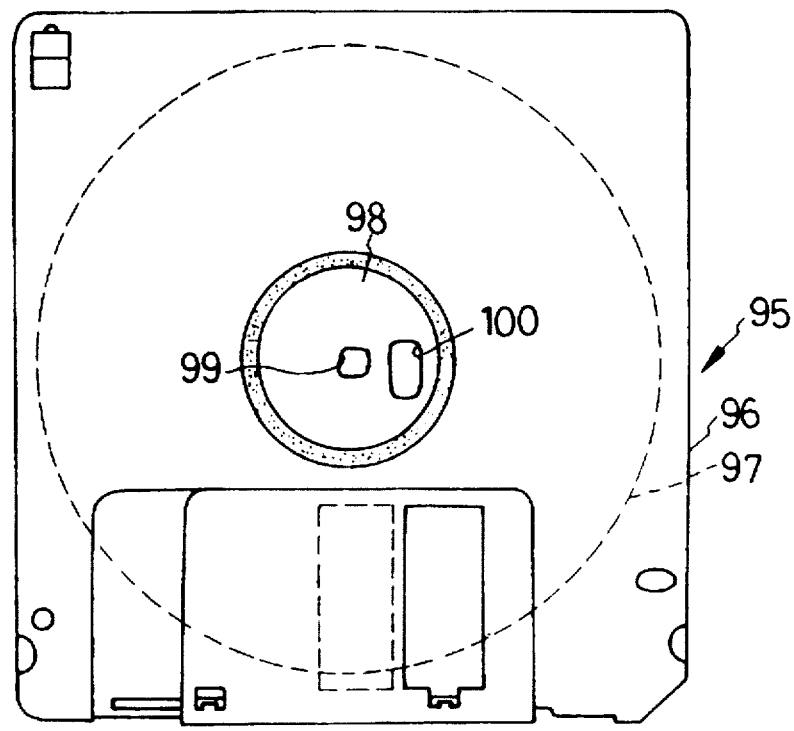
FIG. 9 is a plan view of the FIG. 7 disk cartridge.

It is very likely that the rotor will move when driven reversely even if it will not move when initially driven forwardly. In some flexible magnetic disk drives, the disk may not smoothly start rotation because of the magnetic heads held fast against its opposite surfaces. The disk is not perfectly secured to the turntable in three and a half inch disk drives, however, but is free to rotate relative to the turntable within limits, and so is the rotor relative to the disk regardless of whether the heads stick to the disk or not, as will be better understood from the following description of FIGS. 7–9.

Figure 7:
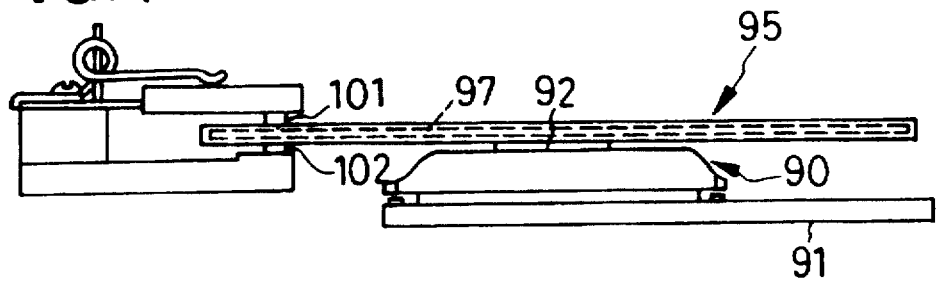
FIG. 7 is an elevational view of a flexible magnetic disk drive incorporating the FIG. 1 motor control system, the disk drive being shown together with a disk cartridge mounted in position thereon.

Illustrated in FIGS. 7 and 8 is a typical construction of a three and a half inch flexible magnetic disk drive incorporating the brushless motor suitable for control according to the present invention. Generally designated 90, the motor has the rotor 1 coupled to a turntable 92 for joint rotation therewith, and the stator windings 2 formed on a printed circuit board 91. The Hall sensor 4 and various other motor control electronics are also formed on the circuit board 91. The rotation of the rotor 1 relative to the stator 2 results directly in the rotation of the turntable 92 about the spindle 93.

FIG. 7 also shows a disk cartridge 95 mounted in position on the turntable 92 and engaged between a pair of magnetic heads 101 and 102. As better illustrated in FIG. 9, the disk cartridge 95 has a casing 96 within which a three and a half inch disk 97 is housed rotatably. The disk 97 is formed in one piece with a metal made hub 98 which has formed therein a central hole 99 for receiving the turntable 93, and an eccentric slot 100 for receiving a drive pin 94, FIG. 8, on the turntable 92.

As has been mentioned, the pair of heads 101 and 102 may stick so fast to the disk 97 that the disk will not rotate when initially driven forwardly as above. However, the dimension of the eccentric slot 100 in the disk hub 98 in the direction of disk rotation is greater than the diameter of the drive pin 94. This clearance permits the turntable 92, and therefore the rotor 1, to rotate somewhat rearwardly by the reverse excitation during the period $T_{11}$ in FIG. 13. Thereupon the disk will be set free from the heads for forward rotation.

Figure 21:
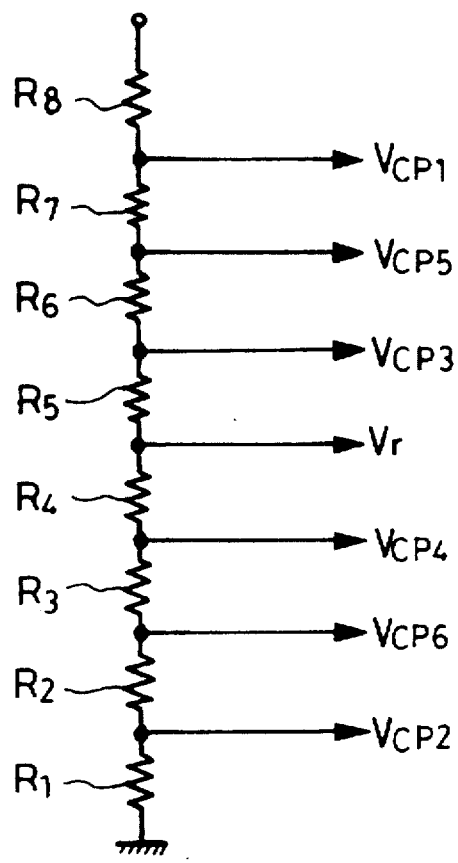
FIG. 21 is a schematic electrical diagram of alternate means for providing the various reference voltages required in the FIG. 1 motor control system.

FIG. 21 shows an alternative power supply circuit for use in the motor control system according to the invention. Instead of providing the separate reference voltage sources 19–23, 88 and 89, FIGS. 2 and 6, as in the foregoing embodiment, all the required voltages $Vcp_1$–$Vcp_6$ and Vr may be obtained from a single supply terminal via resistors $R_1$–$R_8$.

Instead of obtaining the excitation control signals from the counters 41–46 and 57–64, FIG. 4, which provide pulses whose durations determine the required control periods, there may be employed two counters 110 and 111 as in FIG. 22 for obtaining timing signals during the startup period before the moment $t_9$ in FIGS. 12 and 13. These timing signals may be directed into an excitation control signal forming circuit 112 for obtaining the excitation control signals, as described in more detail hereinbelow.

Triggered by a start pulse from the delay circuit 40, FIG. 4, the counter 110 will start counting the clock pulses and put out timing pulses upon counting the pulses for the period $T_0$, the sum of the periods $T_0$ and $T_1$, the sum of the periods $T_0$, $T_1$ and $T_2$, and the sum of the periods $T_0$, $T_1$, $T_2$ and $T_3$. The timing pulses thus produced will be at the moments $t_2$, $t_3$, $t_4$ and $t_9$ in FIG. 12, so that the timing at the last three moments will be produced only when the comparator $CP_1$ FIG. 2, is high at $t_2$ in FIG. 12. The timing pulse at $t_9$ will be produced upon detection of the first reference moment by the reference moment determination circuit 24.

The other counter 111 is configured to put out timing pulses upon counting the clock pulses for the sum of the periods $T_0$ and $T_{11}$, the sum of the periods $T_0$, $T_{11}$ and $T_{12}$, and the sum of the periods $T_0$, $T_{11}$, $T_{12}$ and $T_3$, provided that the comparator $CP_1$ is low at $t_2$ in FIG. 13. More specifically, as both counters 110 and 111 start counting the clock pulses in response to a start pulse, the counter 110 will first produce a timing pulse upon lapse of the period $T_0$, at $t_2$ in FIG. 13. The other counter 111 will then produce timing pulses at $t_3$, $t_4$ and $t_9$ in FIG. 13. The excitation control signals of FIGS. 12 and 13 can be formed by six flip flops utilizing the timing pulses and the start pulse.

Figure 23:
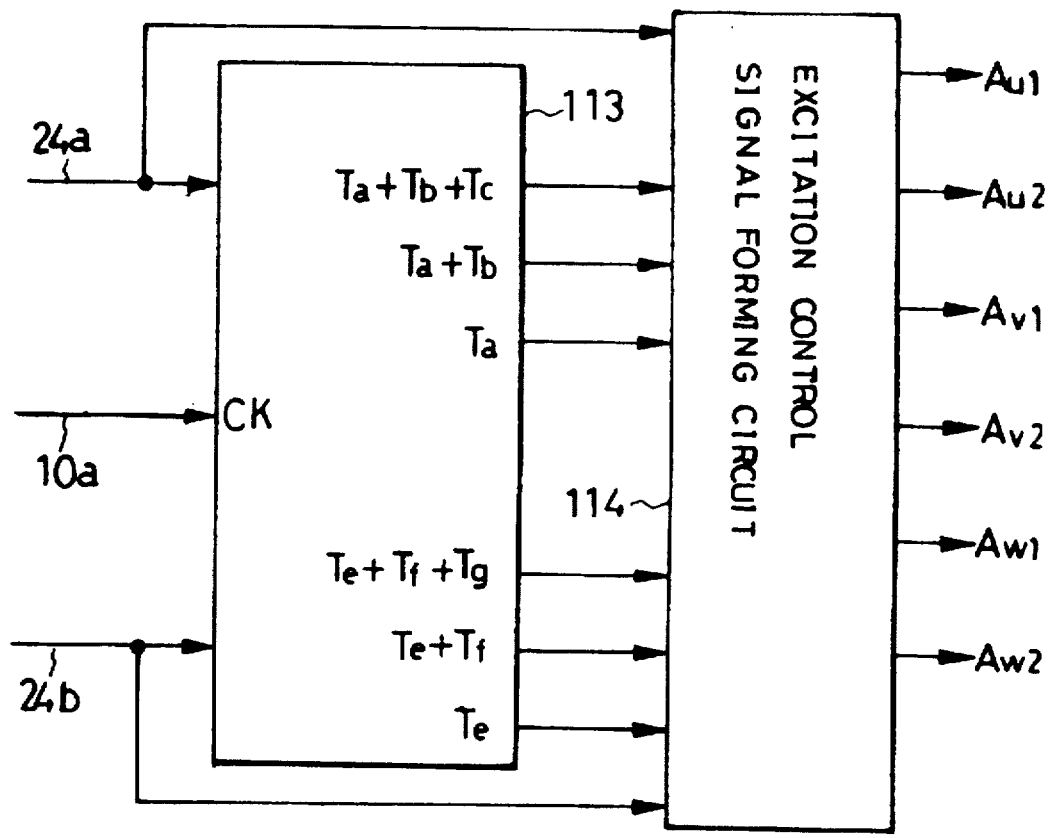
FIG. 23 is a block diagram of alternate means for producing excitation control signals during normal motor rotation.

FIG. 23 illustrates a counter 113 that may be employed in place of the counters 57–64, FIG. 4. The counter 113 has outputs for producing timing pulses indicative of the periods Ta, Ta+Tb, Ta+Tb+Tc, Te, Te+Tf and Te+Tf+Tg. When triggered by the first reference moment signal fed over the line 24a, the counter 113 will put out timing pulses upon lapse of Ta, Ta+Tb and Ta+Tb+Tc, that is, at $t_{11}$, $t_{12}$ and $t_{13}$ in FIG. 12. Also, when triggered by the second reference moment signal fed over the line 24b, the counter 113 will put out timing pulses upon lapse of Te, Te+Tf and Te+Tf+Tg, that is, at $t_{20}$, $t_{21}$ and $t_{22}$ in FIG. 12. The excitation control signal 114 in this case also comprises six flip flops for providing the excitation control signals after the moment $t_9$ in FIG. 12 in response to the counter output signals and the first and the second reference moment signals.

Despite the showings of FIGS. 22 and 23, however, the use of separate counters for excitation control during the startup period and for that during normal rotation is not essential. A single counter may be configured for both purposes.

Figure 24:
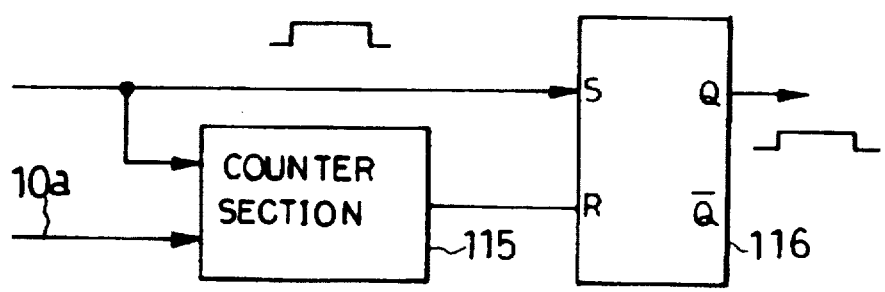
FIG. 24 is a block diagram of a modification of each counter shown in FIG. 4.

As illustrated in FIG. 24, the counters 41–46 and 57–64 of FIG. 4 may each be a combination of a counter section 115 and a flip flop 116. The counter section 115 counts clock pulses when triggered by a start pulse or by an output pulse from the preceding counter. The flip flop 116 is set by a start pulse or by an output pulse from the preceding counter, and reset by a timing pulse produced by the counter section 115.

Figure 25:
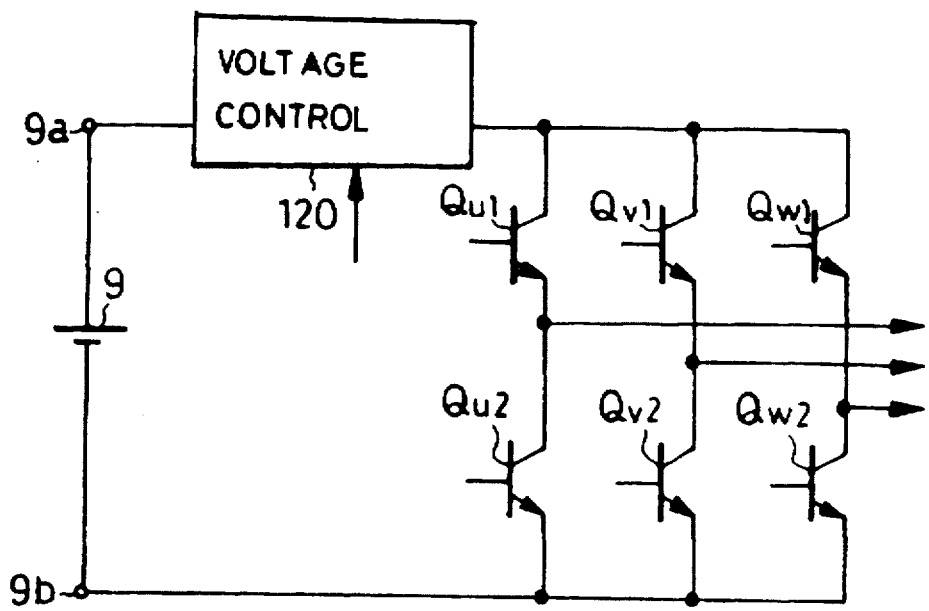
FIG. 25 is a schematic electrical diagram of alternate motor speed control means according to the present invention.

In FIG. 25 is shown a voltage control circuit 120 connected between the power supply 9 and the three phase bridge circuit of transistors $Qu_1$–$Qw_2$ for controlling the motor speed, instead of by controlling the base currents of the transistors as in FIG. 1. The voltage control circuit 120 may take the form of a transistor connected in series with the power supply 9. Motor speed control will then be possible either by controlling the resistance offered by the transistor, or by switching the transistor with a controlled duty ratio and at a rate sufficiently higher than the rate at which the transistors $Qu_1$–$Qw_2$ are switched for motor rotation. Another possible method of motor speed control is to switch either the upper or the lower half, or all, of the transistors $Qu_1$–$Qw_2$ also with a controlled duty ratio and at a rate sufficiently higher than the rate at which they are switched for motor rotation.

Figure 26:
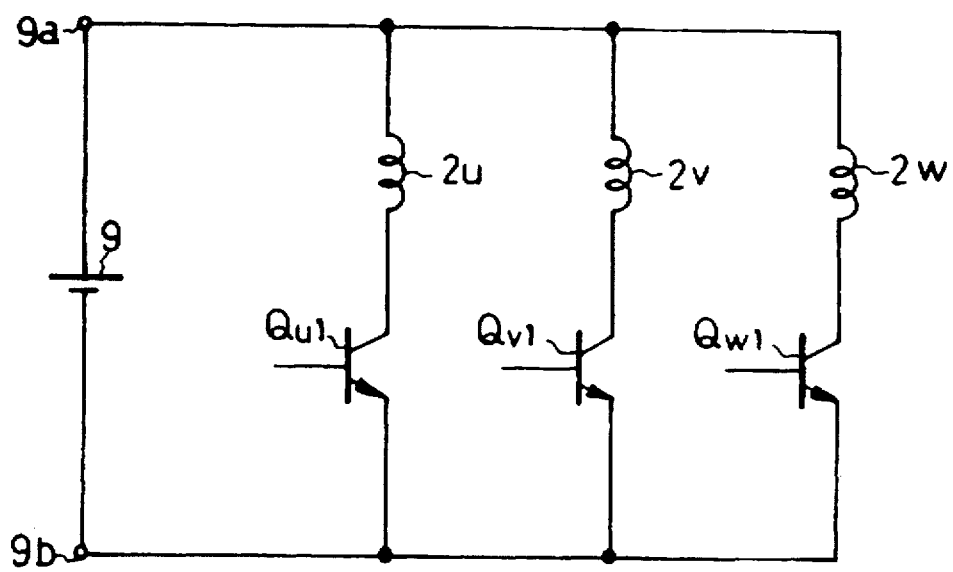
FIG. 26 is a schematic electrical diagram of alternate motor excitation means according to the present invention.

FIG. 26 shows the unipolar driving of the three phase stator windings $2u$, $2v$ and $2w$ by three transistors $Qu_1$, $Qv_1$ and $Qw_2$, instead of the bipolar driving shown in FIG. L. Such unipolar driving is possible by use of the excitation control signals $Su_1$, $Sv_1$ and $Sw_1$ in FIG. 12.

Figure 27:
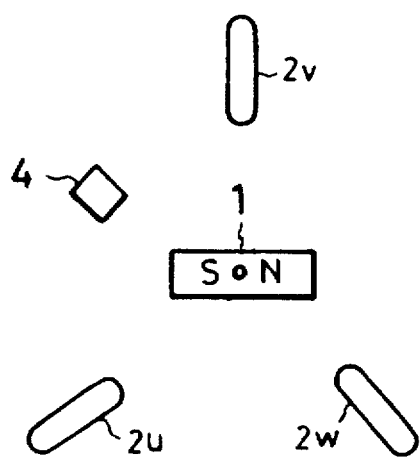
FIG. 27 is a diagram similar to FIG. 17 but explanatory of alternate arrangement of the Hall speed sensor.

As illustrated in FIG. 27, the Hall sensor 4 may be disposed intermediate the stator windings $2u$ and $2v$ for greater ease in designing the motor. The motor may be driven in this case in the sequence of FIG. 18 when the rotor position signal Vs is greater than the voltage $Vcp_2$ and in the sequences of FIGS. 19 and 20 when the signal Vs is equal to or less than the voltage $Vcp_2$.

Additional modifications, such as the following, of the illustrated embodiments will readily suggest themselves to those skilled in the art:

It need not necessarily be the excitation control signals $Su_2$ and $Sv_1$ that are made high during the initial period $T_0$; in bipolar driving, any one of the signals $Su_1$, $Sv_1$ and $Sw_1$, and some other phase one of the signals $Su_2$, $Sv_2$ and $Sw_2$ could be chosen for initial excitation.

The switches $S_1$–$S_6$, FIG. 4, could be connected on the input or output sides of the amplifiers $Au_1$–$Au_2$, respectively.

A differential amplifier could be connected between FVC 71 and amplifier 73a, FIG. 5, to provide a signal indicative of the departure of the FVC output voltage from the reference voltage, for delivery to the combining circuit 73.

All these and other modifications and alterations of the illustrated embodiments within the usual knowledge of the specialists are considered to fall within the scope of the present invention as expressed in the following claims.

What is claimed is:

1. A control system for a brushless electric motor of the type having a permanent magnet rotor and a plurality of phases of stator windings in concentric arrangement, the rotor being rotatable relative to the stator windings, the control system comprising:

(a) a rotor position sensor for providing a rotor position signal having a voltage varying alternatingly in step with the angular position of the rotor relative to the stator windings during the rotation of the rotor;

(b) comparison means connected to the rotor position sensor for providing a plurality of moment signals each indicative of the moment the rotor position signal has one of a set of predetermined different voltage values;

(c) a source of clock pulses;

(d) an excitation control signal forming circuit connected to the comparison means and the clock pulse source for providing a set of excitation control signals, the excitation control signal forming circuit comprising first counter means for providing the excitation control signals of startup waveforms by counting the clock pulses, and second counter means for providing the excitation control signals of normal state waveforms by counting the clock pulses in response to the moment signals; and (e) excitation means connected to the excitation control signal forming circuit for exciting the stator windings of the motor in a first predetermined function during a startup period in response to the excitation control signals of the startup waveforms, and in a second predetermined function after the startup period in response to the excitation control signals of the normal state waveforms.

2. The motor control system of claim 1 wherein the clock pulses have a repetition rate that is an integral multiple of the frequency of the rotor position signal during the rotation of the motor at a normal speed.

3. The motor control system of claim 1 wherein the rotor position sensor is a Hall effect element.

4. The motor control system of claim 1 wherein the comparison means comprises a plurality of comparators for comparing the rotor position signal with the voltage values intermediate the opposite peaks of the rotor position signal during normal rotation of the motor.

5. The motor control system of claim 4 further comprising a reference moment determination circuit connected between the comparison means and the excitation control signal forming circuit for determining particular moments in response to outputs from the comparators, the excitation control signal forming circuit producing the excitation control signals in response to outputs from the reference moment determination circuit.

6. The motor control system of claim 1 wherein the first predetermined function in which the stator windings of the motor are excited during the startup period is such that the rotor is first energized in a forward direction, then in a reverse direction, and then in a forward direction again.

7. The motor control system of claim 1 further comprising speed control means coupled to the excitation means for causing the motor to rotate at a constant speed.

8. The motor control system of claim 7 wherein the speed control means comprises:

(a) speed sensor means for providing a motor speed signal having a voltage indicative of the rotational speed of the motor;

(b) comparison means for providing an intermediate value signal indicative of the moment the rotor position signal has a value intermediate the opposite peaks thereof;

(c) a phase detector circuit for providing a phase difference signal indicative of a phase difference between the intermediate value signal and the clock pulses;

(d) a combining circuit for combining the motor speed signal and the phase difference signal; and (e) means for providing a speed control signal representative of a difference between a predetermined value and an output from the combining circuit.

* * * * *